United States Patent
Sun et al.

(10) Patent No.: US 12,481,019 B2
(45) Date of Patent: Nov. 25, 2025

(54) METHOD AND APPARATUS FOR DETERMINING DEVICE POINTED TO BY USER EQUIPMENT

(71) Applicant: SAMSUNG ELECTRONICS CO., LTD., Suwon-si (KR)

(72) Inventors: Guangyu Sun, Beijing (CN); Yi Yang, Beijing (CN); Qianshao Zhang, Beijing (CN); Daqun Guo, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 600 days.

(21) Appl. No.: 17/873,928

(22) Filed: Jul. 26, 2022

(65) Prior Publication Data
US 2022/0381869 A1   Dec. 1, 2022

Related U.S. Application Data

(63) Continuation of application No. PCT/KR2021/016786, filed on Nov. 16, 2021.

(30) Foreign Application Priority Data

May 28, 2021  (CN) .......................... 202110591904.6

(51) Int. Cl.
  *G01S 5/02*  (2010.01)
  *H04B 1/7163*  (2011.01)
(52) U.S. Cl.
  CPC .......... *G01S 5/0263* (2013.01); *G01S 5/0242* (2013.01); *G01S 5/0289* (2013.01); *H04B 1/7163* (2013.01)
(58) Field of Classification Search
  CPC .... G01S 5/0263; G01S 5/0242; G01S 5/0289; H04B 1/7163

USPC ........ 342/451, 125, 27, 372, 357.29, 357.62
See application file for complete search history.

(56) References Cited

U.S. PATENT DOCUMENTS

| | | |
|---|---|---|
| 7,636,062 B2 | 12/2009 | Ward et al. |
| 8,149,107 B2 | 4/2012 | Richards et al. |
| 9,462,108 B2 | 10/2016 | Ko et al. |
| 9,844,096 B2 | 12/2017 | Son et al. |

(Continued)

FOREIGN PATENT DOCUMENTS

| | | |
|---|---|---|
| KR | 10-2017-0073169 A | 6/2017 |
| KR | 10-2018-0082789 A | 7/2018 |

(Continued)

OTHER PUBLICATIONS

International Search Report (PCT/ISA/210) issued Mar. 2, 2022 by the International Searching Authority in counterpart International Patent Application PCT/KR2021/016786.

(Continued)

*Primary Examiner* — Bo Fan
(74) *Attorney, Agent, or Firm* — Sughrue Mion, PLLC

(57) ABSTRACT

A method and apparatus for determining a device pointed to by a UE is provided. The method includes determining UE pointing information based on spatial information of UWB devices; and determining a target non-UWB device pointed to by the UE based on the UE pointing information and spatial information of at least one non-UWB device. The disclosure determines a target non-UWB device pointed to by the UE in the UWB environment based on spatial perception capability of UWB and improve the user experience of UWB pointing operations.

19 Claims, 33 Drawing Sheets

(56) References Cited

U.S. PATENT DOCUMENTS

| | | | |
|---|---|---|---|
| 11,026,067 B2 | 6/2021 | Martin et al. | |
| 11,246,010 B2 | 2/2022 | Mao et al. | |
| 2017/0097413 A1* | 4/2017 | Gillian | G01S 7/4004 |

FOREIGN PATENT DOCUMENTS

| | | | |
|---|---|---|---|
| KR | 10-2019-0131923 A | 11/2019 | |
| KR | 10-2076489 B1 | 2/2020 | |
| WO | 2019/169320 A1 | 9/2019 | |
| WO | 2020/062038 A1 | 4/2020 | |

OTHER PUBLICATIONS

Written Opinion (PCT/ISA/237) issued Mar. 2, 2022 by the International Searching Authority in counterpart International Patent Application PCT/KR2021/016786.

* cited by examiner

Set space coordinate P value range of r, θ, φ

METHOD AND APPARATUS FOR DETERMINING DEVICE POINTED TO BY USER EQUIPMENT

CROSS-REFERENCE TO RELATED APPLICATION(S)

This application is a by-pass continuation of PCT International Application No. PCT/KR2021/016786, filed on Nov. 16, 2021, and is based on and claims priority under 35 U.S.C. § 119 to a Chinese Patent Application No. 202110591904.6 filed on May 28, 2021, in the China National Intellectual Property Administration, the disclosure of which is incorporated by reference herein in its entirety.

BACKGROUND

1. Field

The disclosure relates to a field of communication technology. In particular, the disclosure to a method and apparatus for determining a device pointed to by a user equipment (UE).

2. Description or Related Art

Ultra Wide Band (UWB) technology is a wireless carrier communication technology, which belongs to one of the important technologies of the next-generation Internet of Things. However, most of the related art Internet of Things (IoT) devices do not support UWB technology, and as such, IoT applications cannot interact with non-UWB devices using UWB technology.

SUMMARY

Currently, for non-UWB devices, a user equipment (UE) may connect to non-UWB devices through Bluetooth® (BT) or Wireless Fidelity (WI-FI) in IoT applications; that is, for UWB devices and non-UWB devices, users need to adopt different methods to interact with them when using the UE. Based on this, the interaction manners for UWB devices and non-UWB devices are significantly different, and the user experience is diminished.

One or more aspects of the disclosure addresses and solves at least one of the above-mentioned technical problems. The disclosure relates to a method and apparatus for determining a device pointed to by a user equipment (UE).

According to an aspect of the disclosure, there is provide a method for determining a device pointed to by a user equipment (UE), including: determining UE pointing information based on spatial information of one or more Ultra Wide Band (UWB) devices; and determining a target non-UWB device pointed to by the UE based on the UE pointing information and spatial information of at least one non-UWB device.

The determining the UE pointing information based on the spatial information of the one or more UWB devices may include: determining position information of the UE based on relative position information between the UE and the one or more UWB devices; and determining the UE pointing information based on the position information of the UE.

The determining the position information of the UE based on the relative position information between the UE and the one or more UWB devices may include: determining position information of each of the one or more UWB devices in a set space coordinate system; determining respective relative position information between the UE and each of the one or more UWB devices; determining the position information of the UE in the set space coordinate system, based on the position information of each of the one or more UWB devices in the set space coordinate system and the relative position information between the UE and each of the one or more UWB devices.

The relative position information may include relative distance information and relative direction information.

The set space coordinate system may be a three-dimensional coordinate system based on any set position as an origin, and wherein the set position may include the positions where the one or more UWB devices is located.

The determining the UE pointing information based on the position information of the UE may include: determining measurement position information of the UE and each of the one or more UWB devices in a UE measure coordinate system respectively, the UE measure coordinate system having a origin of the position of the UE, a X axis parallel to a width direction of the UE, and a Y axis parallel to a length direction of the UE, and a Z axis perpendicular to a setting plane of the UE; determining reference position information of the UE and each of the one or more UWB devices in a UE reference coordinate system respectively, the UE reference coordinate system having an origin of the position of the UE, and coordinate axes parallel to corresponding coordinate axes of the set space coordinate system; and determining the UE pointing information based on the measurement position information and the reference position information of the UE and each of the one or more UWB devices.

The determining the target non-UWB device pointed to by the UE based on the UE pointing information and the spatial information of the at least one non-UWB device may include: determining one or more candidate non-UWB devices pointed to by the UE, based on the UE pointing information and the spatial information of the at least one non-UWB device, and determining the target non-UWB device pointed to by the UE from among the one or more candidate non-UWB devices.

The determining the one or more candidate non-UWB devices pointed to by the UE may include: acquiring spatial information of the at least one non-UWB device, the spatial information of the at least one non-UWB device comprises position information or picking-region information of the at least one non-UWB device; and based on a determination that the UE pointing information intersects a picking-region of any of the at least one non-UWB device, or a deviation between the UE pointing information and a direction of the UE position to a position of any of the at least one non-UWB device is within a preset deviation range, determining the non-UWB device as the one or more candidate non-UWB devices pointed to by the UE.

The determining the target non-UWB device pointed to by the UE among the one or more candidate non-UWB devices may include: based on a number of the one or more candidate non-UWB devices being one, determining the candidate non-UWB device as the target non-UWB device pointed to by the UE; based on the number of the one or more candidate non-UWB devices being zero: identifying an unregistered non-UWB device, and acquiring spatial information of the unregistered non-UWB device, and re-performing the determining the target non-UWB device pointed to by the UE; or identifying a non-UWB device that has moved, displaying movement guidance information corresponding to when pointing to the non-UWB device that has moved on a user interface, and in response to an operation event of the UE pointing information moving to an original position of the non-UWB device, determining the non-UWB device that has moved as the target non-UWB device pointed to by the UE; based on the number of the one or more candidate non-UWB devices being greater than 1: adjusting the picking-region corresponding to each of the one or more candidate non-UWB devices based on overlapping of picking-regions corresponding to the one or more candidate non-UWB devices, and determining the target non-UWB device pointed to by the UE based on the adjusted picking-region; or displaying movement guidance information corresponding to when pointing to each of the one or more candidate non-UWB devices on the user interface based on the overlapping of picking-regions corresponding to the candidate non-UWB devices, and determining the target non-UWB device pointed to by the UE based on a current movement information of the UE.

The identifying the unregistered non-UWB device may include identifying the unregistered non-UWB device based on captured image information.

The acquiring spatial information of the unregistered non-UWB device, comprises: in response to an operation event of placing the UE at the position of the unregistered non-UWB device, acquiring spatial information of the UE as the spatial information of the unregistered non-UWB device; or acquiring distance information between the UE and the unregistered non-UWB device, and determining the spatial information of the unregistered non-UWB device based on the distance information and the UE pointing information.

The method may further include: acquiring a control entrance of the target non-UWB device; and controlling the target non-UWB device based on the control entrance.

The controlling the target non-UWB device based on the control entrance may include: controlling the target non-UWB device based on the control entrance connected through a Bluetooth or Wi-Fi.

The method may further include determining one or more candidate UWB devices pointed to by the UE based on the UE pointing information; and based on a number of the one or more candidate UWB devices being zero, performing the determining the target non-UWB device pointed to by the UE based on the UE pointing information and the spatial information of the at least one non-UWB device.

The method may further include based on the number of the one or more candidate UWB devices being one, determining that the candidate UWB device is the target UWB device pointed to by the UE; based on the number of the one or more candidate UWB devices being greater than two, performing at least one of the following: when relative directions of at least two of the one or more candidate UWB devices to the UE are different, determining the target UWB device pointed to by the UE based on a predefined mapping relationship between the UE pointing and overlapping region; when at least two of the one or more candidate UWB devices are in a direction pointed to by the UE, displaying movement guidance information corresponding to when pointing to each of the one or more candidate UWB devices on an user interface, and acquiring current movement information of the UE to determine the target UWB device pointed to by the UE; or when the at least two of the one or more candidate UWB devices are in a direction pointed to by the UE, displaying distance information between the UE and each of the one or more candidate UWB devices on the user interface.

According to one or more aspects of the disclosure, there is provided a method, an apparatus and/or a system for determining a device pointed to by a UE. The method includes determining a target non-UWB device pointed to by the UE in the UWB environment based on spatial information of UWB devices. That is, the method includes determining a target non-UWB device pointed to by the UE based on the UE pointing information (which may be determined through UWB devices adjacent to the UE) and spatial information of non-UWB devices (that is, identifying a non-UWB device through a UE pointing). In comparison with the related art technologies, the method, the apparatus and/or the system of the disclosure effectively solves the problem in the related art technologies that users need to adopt different interaction methods when using UE to interact with UWB devices and non-UWB devices. The disclosure performs the UWB interaction capability of non-UWB devices, to provide the same user experience for the non-UWB devices as UWB devices in the UWB environment, and improve the user experience of UWB pointing operations.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
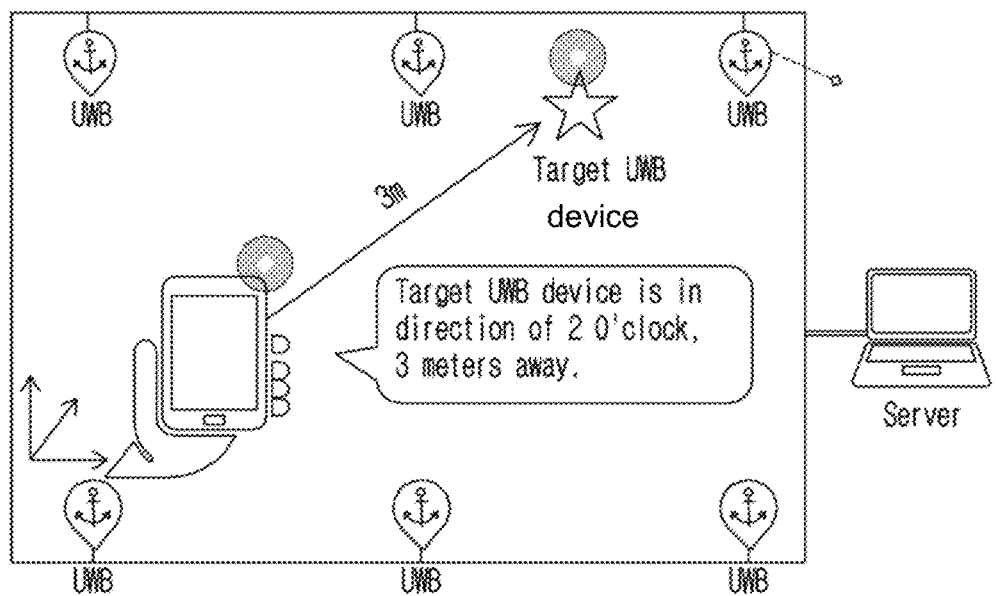
FIG. 1 is a schematic diagram showing the UWB spatial perception capability in a comparative example of a related technology.

Embodiments of the disclosure will be described in detail hereafter. One or more example embodiments have been illustrated in the drawings throughout which same or similar reference numerals refer to same or similar elements or elements having same or similar functions. The example embodiments described hereafter with reference to the drawings are illustrative, merely used for explaining the disclosure and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to make the purpose, technical solutions and advantages of the disclosure clearer, the following example embodiments are described in detail with reference to the accompanying drawings. The following description of the example embodiments are not intended to limit the scope of the inventive concept unless defined by the claims.

The disclosure relates to an Ultra Wide Band (UWB) technology and Internet of Things (IoT) technology.

The UWB technology is a wireless carrier communication technology that uses nanosecond-level non-sinusoidal narrow pulses to transmit data, which has advantages of low system complexity, high data transmission rate, low power consumption, high security, and accurate positioning and has spatial perception capability. For example, the accuracy can reach±10 cm±3°, the sight distance range accuracy is ±10 cm, the sight distance angle accuracy is ±3°, etc. The spatial perception capability may include the capability of perceiving distance and direction.

Figure 2:
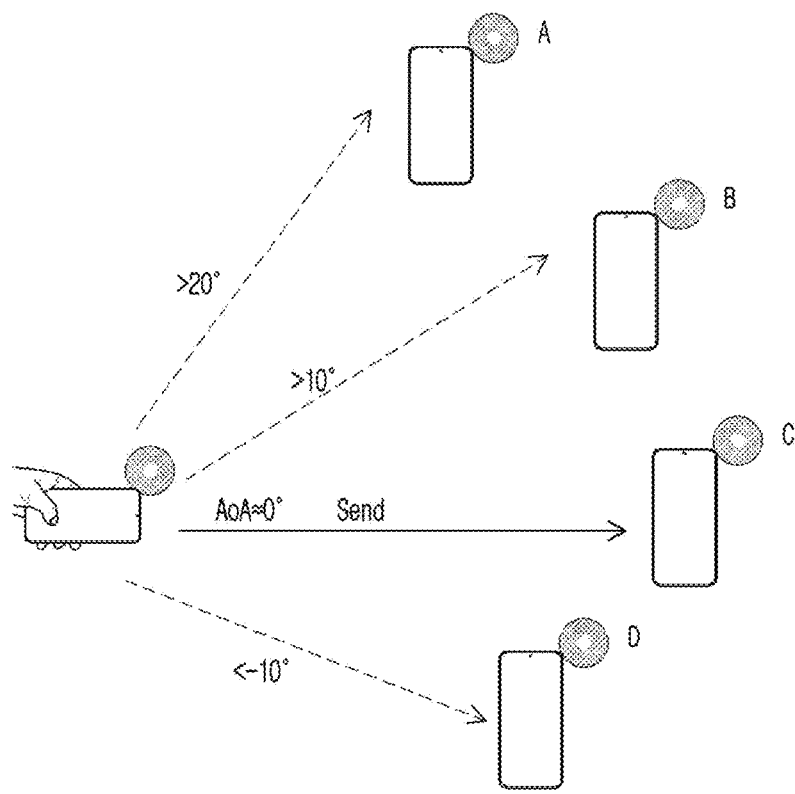
FIG. 2 is a schematic diagram showing selection of a recipient through UE pointing to in a comparative example of a related technology.
Figure 3:
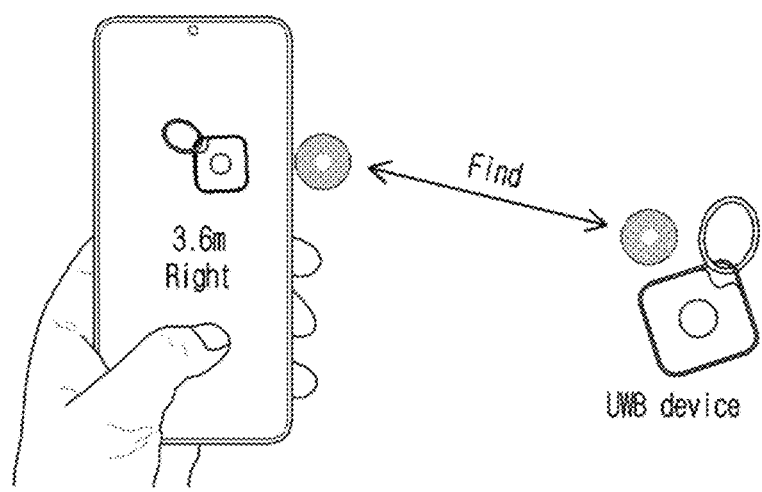
FIG. 3 is a schematic diagram showing helping users to find UWB devices through UE pointing to in a comparative example of a related technology.
Figure 4:
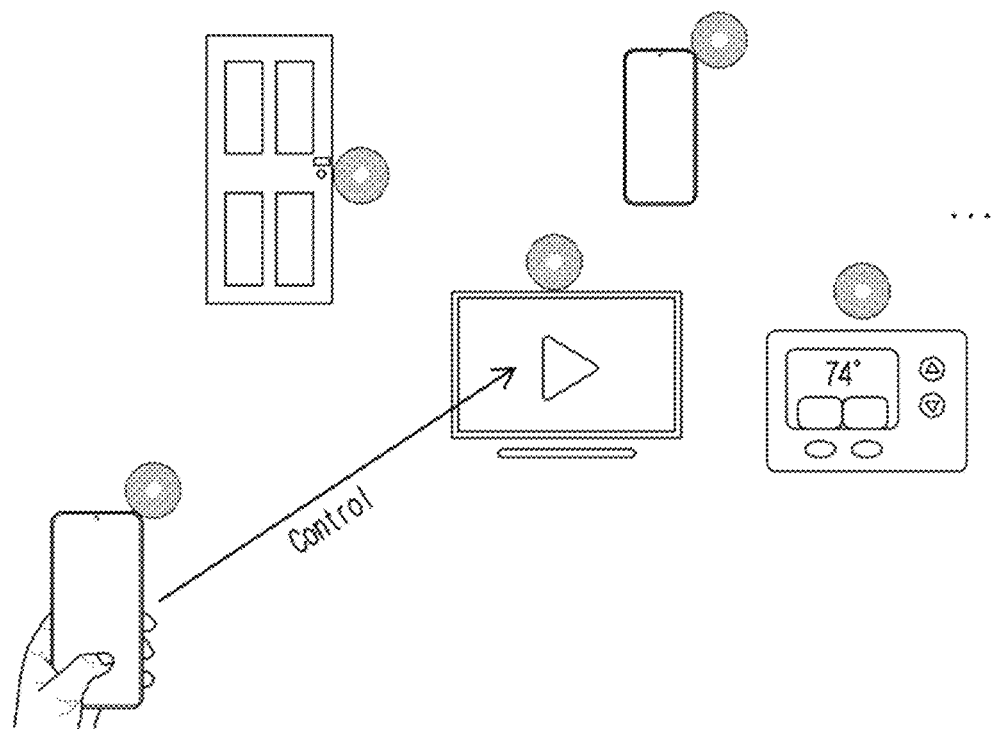
FIG. 4 is a schematic diagram showing that a UE points to a UWB device in a comparative example of a related technology.

The following describes a spatial perception capability of UWB with reference to FIG. 1, FIG. 2, FIG. 3, and FIG. 4. As shown in FIG. 1, in a UWB environment, when a user uses a user equipment (UE) with UWB function, a relative direction and relative position of a certain designated UWB device and the UE may be known based on the spatial perception capability of UWB. In FIG. 1, a designated UWB device is located in the two o'clock direction of the UE and is 3 meters apart from the UE. As shown in FIG. 2, based on the spatial perception capability of UWB, the selection of a direction in which the UE is pointing and a recipient of the data may be determined. For example, as shown in FIG. 2, when a user uses a UE with UWB function, the selected recipient may be determined by an UWB device pointing to the user C, instead of selecting the recipient based on the user's related information (such as name and icon). In FIG. 2, an angle-of-arrival (AOA) is a measure of a propagation direction of wave radiation reaching an observation point, that is, an inclined angle between the wave ray and a certain direction (a horizontal plane or a horizontal plane normal). As shown in FIG. 3, based on the spatial perception capability of UWB, an UWB device may be found through the UE pointing to the UWB device. As shown in FIG. 4, based on the spatial perception capability of UWB, the UWB device to which the UE points may be controlled.

Internet of Things (IoT) refers to real-time collection of various required information, such as sound, light, heat, electricity, mechanics, chemistry, biology, position, etc. of objects or processes that need to be monitored, interacted or inactivated though any information sensors, radio frequency identification technology, global positioning system, infrared sensors, laser scanners and other devices and technologies, to realize ubiquitous connection of things and things, things and people through various possible network access and to realize the intelligent perception, recognition and management of things and processes. The IoT is an information carrier based on the Internet and traditional telecommunications networks, which may combine various information sensing devices with the network to realize the interconnection and intercommunication of people, machines, and things at any time and place.

The UWB technology is one of the important technologies of the next-generation IoT, but most of the existing IoT devices do not support UWB technology (devices that do not support UWB technology are referred to as non-UWB devices in the disclosure). Therefore, IoT applications cannot interact with non-UWB devices through a UWB way, which will result in diminished or poor user experience.

In the case, in which, the non-UWB device does not support UWB interaction, although the UE can be connected to the non-UWB device through Bluetooth (BT) or Wireless Fidelity (WI-FI) in IoT applications, the non-UWB device cannot be identified through the spatial perception capability of UWB when the UE points to a non-UWB device. Therefore, it is still not possible to obtain an ID and control entrance of the non-UWB device by pointing to the non-UWB device, and then to control the non-UWB device. That is, the UE cannot identify, find and control the non-UWB device by pointing to the non-UWB device.

Considering the issues of equipment cost and life cycle, the replacement of non-UWB devices is a gradual process, that is, the non-UWB devices and UWB devices will coexist for a long time. Therefore, different interaction methods will influence the user experience for a long time.

In view of at least one of the above-mentioned technical problems in the related art technology or points to be improved, the disclosure provides a method and apparatus for determining a device pointed to by a user equipment (UE), including: determining a target non-UWB device pointed to by the UE in UWB environment based on spatial perception capability of UWB devices, that is, identifying a non-UWB device through UE pointing, to improve the user's experience of UWB pointing operation.

The technical solution of the disclosure and how the technical solution of the disclosure solves the above technical problems will be described in detail below with one or more example embodiments. The following example embodiments may be combined with each other, and the same or similar concepts or processes may not be repeated in some example embodiments. The embodiments of the disclosure will be described below in conjunction with the accompanying drawings.

In the disclosure, the UE may communicate with one or more core networks via a radio access network (RAN). The UE may be a device that provides voice and/or data connectivity to the user, a handheld device with a wireless connection function, or other processing devices connected to a wireless modem, and so on. In different systems, the UE may have different names. For example, in a 5G system, the UE may be called a wireless UE. A wireless UE can communicate with one or more core networks (CN) via a radio access network (RAN). The wireless UE may be a mobile UE, such as a mobile phone (or cellular phone) and a computer with mobile user equipment, for example, portable, pocket-sized, handheld, computer-built or vehicle-mounted mobile devices, which exchange language and/or data with the wireless access network. For example, Personal Communication Service (PCS) phones, cordless phones, Session Initiated Protocol (SIP) phone, wireless local loop (WLL) station, and personal digital assistants (PDA) and other equipment. Wireless user equipment may also be called system, subscriber unit, subscriber station, mobile station, mobile, remote station, access point, remote user equipment (remote terminal), access user equipment (access terminal), user equipment, user agent, user device, which are not limited in the example embodiments of the disclosure. For example, in the method for determining the device pointed to by a UE provided in the disclosure, the UE involved refers to a UE with UWB function.

According to an example embodiment illustrated in FIG. 5, the method for determining a device pointed to by a UE provided in the disclosure may be used in the following scenarios. In a UWB environment, there are some UWB devices that support UWB technology and some non-UWB devices that do not support UWB technology. According to an example embodiment of the disclosure, a non-UWB device to which the UE points may be determined. Non-UWB devices may be ordinary physical objects (such as windows, sofas, message boards, etc.), smart devices (such as smart door locks, smart sweeping robots, etc.), mobile terminals that do not have UWB function, and so on.

The foregoing is only an application example of the method for determining a device pointed to by a UE of the disclosure, and does not limit the specific application scenario of the method for determining a device pointed to by a UE of the disclosure.

Figure 5:
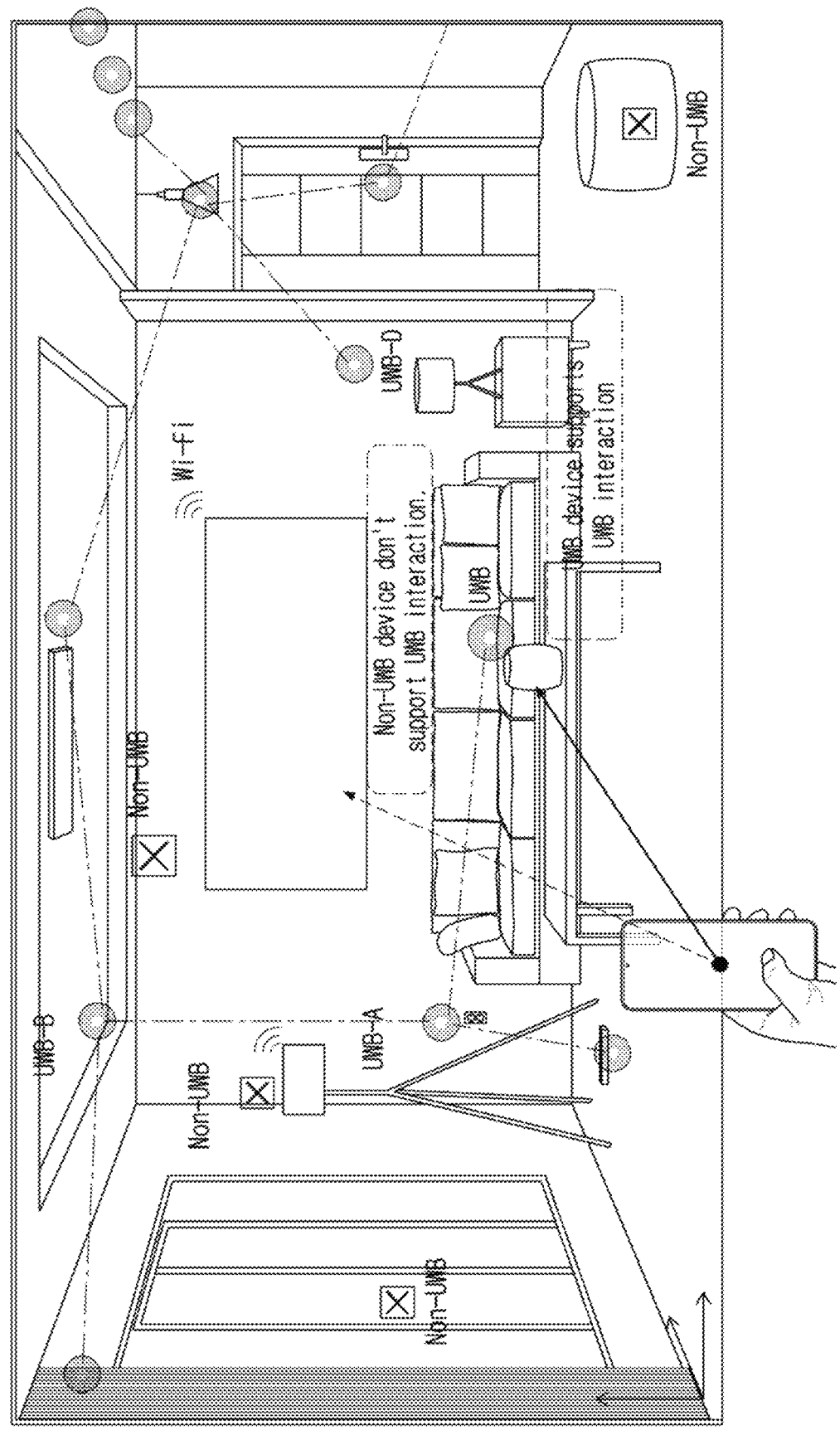
FIG. 5 is a schematic diagram of an application environment of a method for determining a device pointed to by the UE according to an example embodiment of the disclosure.
Figure 6:
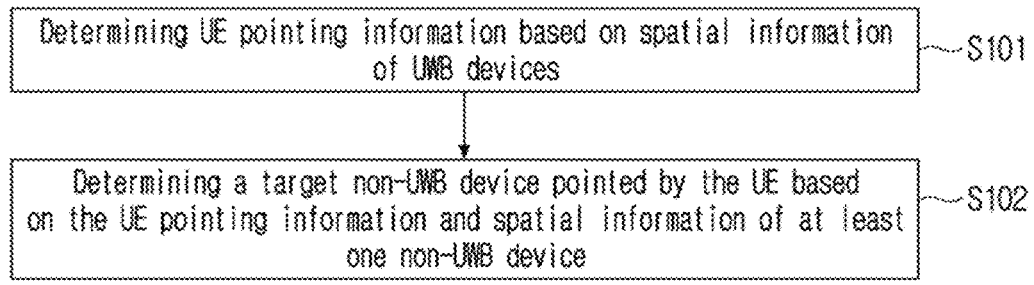
FIG. 6 is a schematic flowchart of a method for determining a device pointed to by the UE according to an example embodiment of the disclosure.

According to an example embodiment illustrated in FIG. 6, a method for determining a device pointed to by a UE is provided, which may be applied to the UE shown in FIG. 5 or other devices configured with UWB chip. In addition to UWB functions, the devices may also have a system environment for running various programs and the ability to interact with the outside world. In the following example embodiments, the UE may execute or perform the method for determining a device pointed to by a UE.

According to an example embodiment, the method includes determining UE pointing information based on spatial information of UWB devices (operation S101) and determining a target non-UWB device pointed to by the UE based on the UE pointing information and spatial information of at least one non-UWB device (operation S102).

For example, the spatial information may include at least one of position information, direction information, and distance information. The spatial information of a UWB device may include the position information indicating the position of the UWB device. The spatial information of a non-UWB device may include the position information indicating the position of the non-UWB device, and the direction information indicating the direction of the non-UWB device.

According to an example embodiment, the UE pointing information includes information indicating the pointing direction of the UE. The UE pointing information may be determined based on the position information of the UE, after determining the position information of the UE by using the spatial information of UWB devices adjacent to the UE, the specific implementation process will be described in subsequent embodiments.

According to an example embodiment, the spatial information of the UWB device, the UE pointing information, and the spatial information of the non-UWB device may be absolute spatial information.

According to an example embodiment, the UE pointing information may be determined based on the spatial information of the UWB devices, and then a target non-UWB device pointed to by the UE may be determined based on the determined UE pointing information and the spatial information of the non-UWB devices. According to an example embodiment, the spatial information of the non-UWB devices may be preset.

The specific processes of determining the UE pointing information is explained below.

According to an example embodiment, in operation S101, the determining of the UE pointing information based on spatial information of UWB devices may include the following operations A1 and A2.

In operation A1, the method includes determining the position information of the UE based on relative position information of the UE and the UWB devices.

For example, the relative position information of the UE and the UWB devices includes relative distance information and relative direction information. That is, the relative distance and relative direction formed by the position of the UE and the position of the UWB device.

According to an example embodiment, the position information indicating the position of the UWB device in the spatial information of the UWB device may be preset, that is, it may be understood that the UWB device has a fixed position. Based on the UWB device having a fixed position, when the UE is at any position in space, the relative distance information between the UE and the UWB device (i.e., the distance between the UE and the UWB device) and the relative direction information (i.e., the direction the UE points to the UWB device, which may be determined through an angle of arrival (AOA), Time of Flight (TOF) and other algorithms) may be determined, and the position information of the UE in the same coordinate system as the UWB devices may be determined. According to an example embodiment, the measurements related to the direction and the angle may be implemented by other algorithms of AOA, TOF, or UWB, but the disclosure is not limited thereto.

The following describes the basic conditions required for the performing operation A1 according to an example embodiment.

According to an example embodiment, in the UWB environment, which involves a three-dimensional (3D) positioning system, absolute spatial information of each of devices by setting a space coordinate system may be recorded. According to an example embodiment, the UWB environment may be applied to an indoor scene. For example, the set space coordinate system may be an indoor coordinate system established indoors. Geographic coordinates of multiple UWB devices may be referred to, or a UWB device at a fixed position may be selected to construct coordinates. The X axis of the set space coordinate system may represent the longitude of the device, the Y axis may represent the latitude of the device and the Z axis may represent the height of the device. A coordinate P corresponding to the set space coordinate system may be expressed as p(x, y, z). According to an example embodiment, the relative spatial relationship between the UE and the UWB device may also be expressed through a polar coordinate in the disclosure, and a polar coordinate ρ may be expressed as ρ(r, Θ, Φ), where the center origin of the polar coordinate corresponds to the position of the UE, r is the distance from the UE to the UWB device, and Θ and Φ represent the directional relationship between the UE and the UWB device.

According to an example embodiment, there may be multiple UWB devices in the UWB environment, but for some UWB devices that are at different regions from the region where the user uses the UE or are far away from the position where the user uses the UE, the information corresponding to them is not of high reference value when determining the position information of the UE. Therefore, according to an example embodiment, the UWB devices adjacent to the UE may be determined first, for example, a UWB device, which is apart from the UE within a range, is determined as a neighboring UWB device, and the UE pointing information may be determined based on the spatial information of the UWB devices adjacent to the UE. The distance between each of UWB devices and the UE may be determined by using the UWB ranging function of the UE. According to an example embodiment, the range may be preset.

According to an example embodiment, the preset range may be a fixed range, or it may be adjusted in real time based on the current position of the UE. For example, when it is determined that the UE is currently in an office area through a positioning technology, since there are many UWB devices included in the UWB environment corresponding to the office area, the preset range may be reduced. On the other hand, when it is determined that the UE is currently in the dining area, since there are fewer UWB devices in the UWB environment corresponding to the dining area, the preset range may be expanded.

According to an example embodiment, it may be determined that the UWB devices included in the area are neighboring UWB devices based on the area where the UE is located. For example, when it is determined that the UE is currently in a bedroom through a positioning technology, it is determined that the UWB devices in the bedroom are neighboring UWB devices.

According to an example embodiment, the determining position information of the UE based on relative position information of the UE and the UWB devices in operation A1 includes the following operations A11-A13:

According to an example embodiment, operation A11 includes determining position information of each of UWB devices in a set space coordinate system.

Figure 7A:
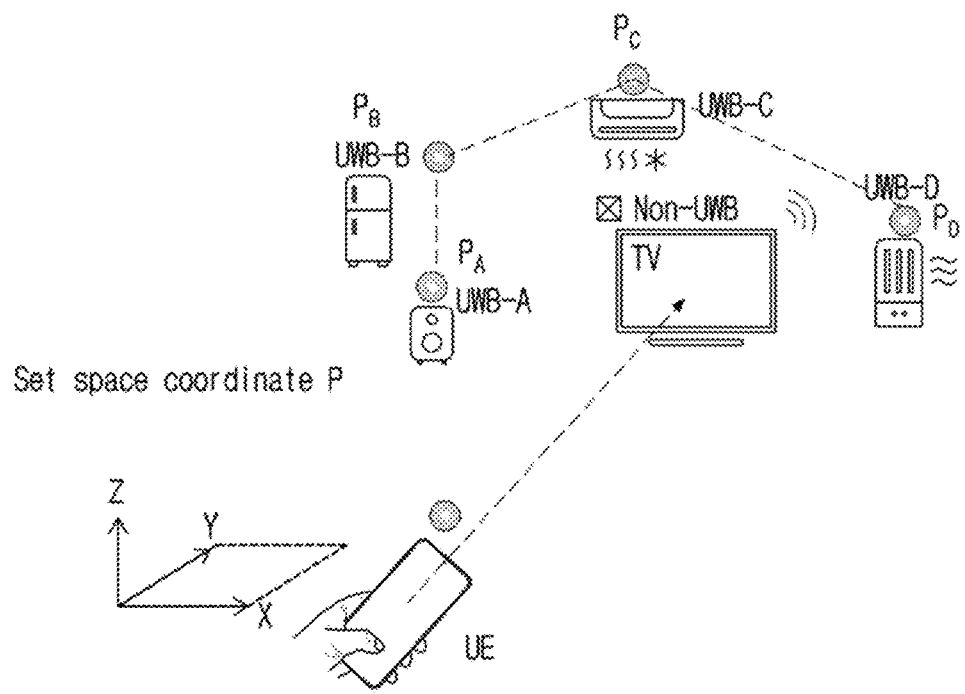
FIG. 7A is a schematic diagram of determining the position information of a UWB device in a set space coordinate system according to an example embodiment of the disclosure.
Figure 7B:
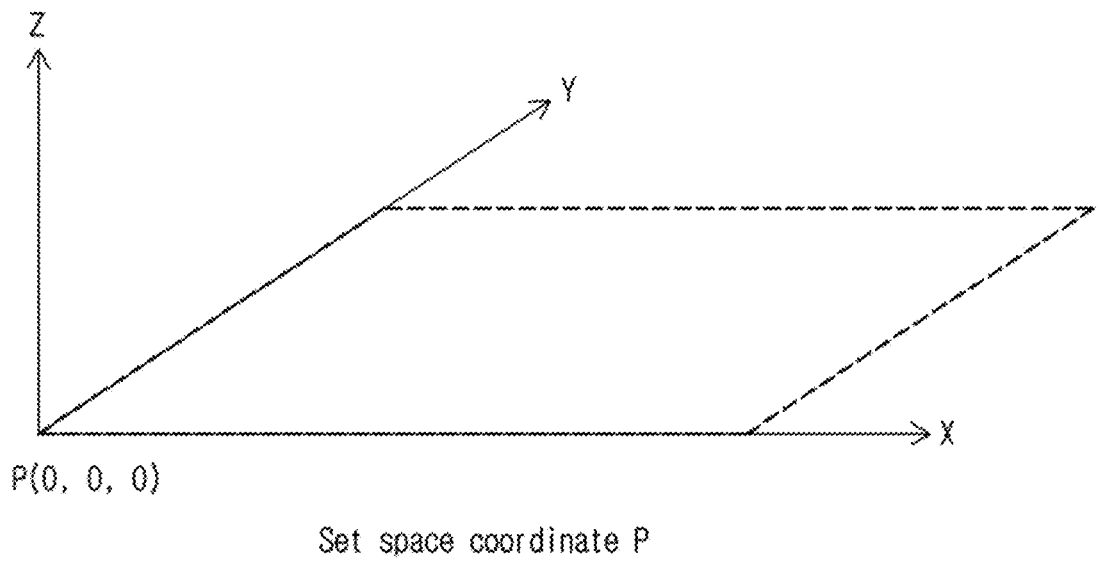
FIG. 7B is a schematic diagram of a set space coordinate system according to an example embodiment of the disclosure.

The set space coordinate system (as shown in FIG. 7B) may be a three-dimensional coordinate system constructed with any set position as the origin. For example, in an office scenario, an entrance and an exit in the office area may be used as the origin of the space coordinate system at each application. According to an example embodiment, any set position may include the position of any UWB device. If four UWB devices A, B, C, and D are fixedly placed in the office area, the position of device A may be used as the origin to construct the set space coordinate system.

An explanation will be given for the case of constructing a set space coordinate system with the position of any UWB device as the origin as follows. According to an example embodiment, a UWB device at a fixed position is selected as a UWB anchor, and the position is determined as the origin (0, 0, 0) of the set space coordinate system. Accordingly, a user may use a UE with UWB function to approach UWB anchor, and measure the position information (coordinate information in the set space coordinate system) of other UWB devices through the measurement function of UWB Range (measuring distance) and AOA (measuring direction) or TOF and other algorithms. The UWB positioning accuracy is +/−10 cm.

An explanation will be given for the case of constructing a set space coordinate system with any set position (any position other than the position of the UWB device) as the origin as follows. According to an example embodiment, any set position is selected to determine the origin (0, 0, 0) of the set space coordinate system, a user can use a ruler or laser to measure and mark the position information of each of UWB devices (coordinate information in the set space coordinate system).

According to an example embodiment, as shown in FIG. 7A, assuming that the UWB environment includes four UWB devices, UWB-A, UWB-B, UWB-C, and UWB-D, through the execution of the above operation A11, the position information of the UWB devices in the set space coordinate system may be determined, and is marked as $P_A$, $P_B$, $P_C$ and $P_D$.

According to an example embodiment, operation A12 includes determining the relative position information of the UE and each of UWB devices.

Figure 8:
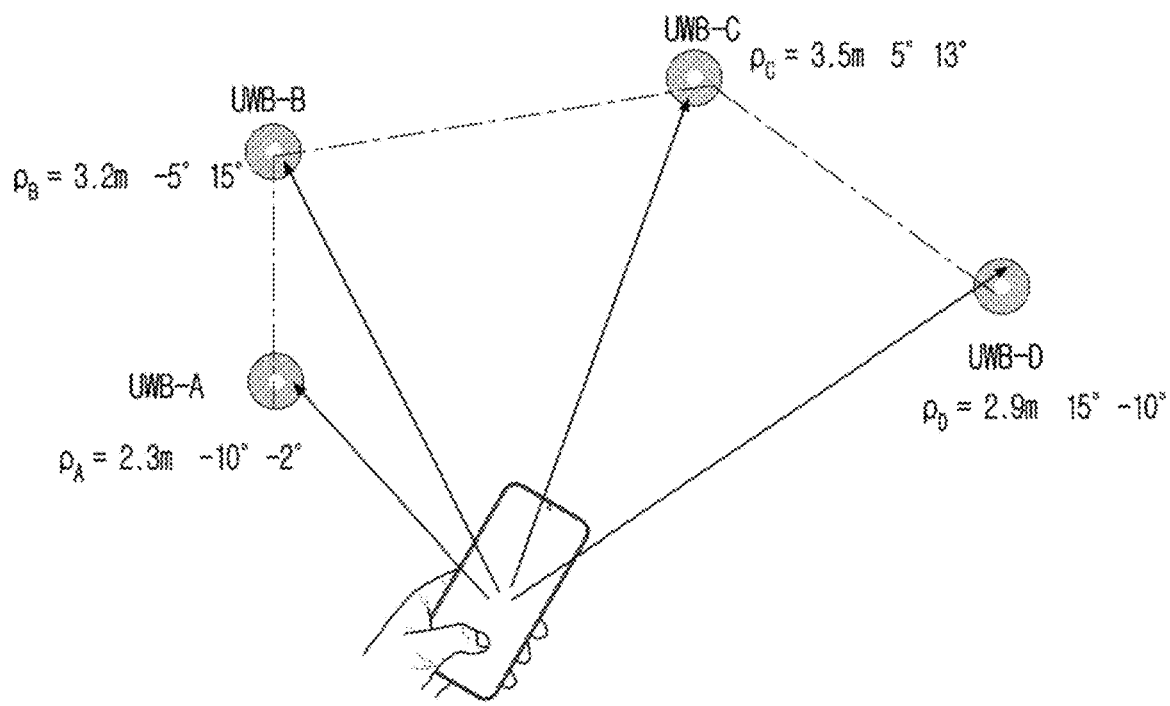
FIG. 8 is a schematic diagram showing relative spatial information of a UE and a UWB device according to an example embodiment of the disclosure.

As shown in FIG. 8, according to an example embodiment, polar coordinates are used to represent the UWB measure coordinates of the UE, which characterize the relative distance information and relative direction information between the UE and the UWB devices, that is, the relative distance information and relative direction information may be represented through polar coordinate information. According to an example embodiment, the polar coordinate information corresponding to the UWB-A, UWB-B, UWB-C, and UWB-D are marked as $\rho_A$, $\rho_B$, $\rho_C$ and $\rho_D$.

According to an example embodiment, operation A13 includes determining the position information of the UE in the set space coordinate system, based on the position information of each of UWB devices in the set space coordinate system and the relative position information of the UE and each of UWB devices.

Figure 9:
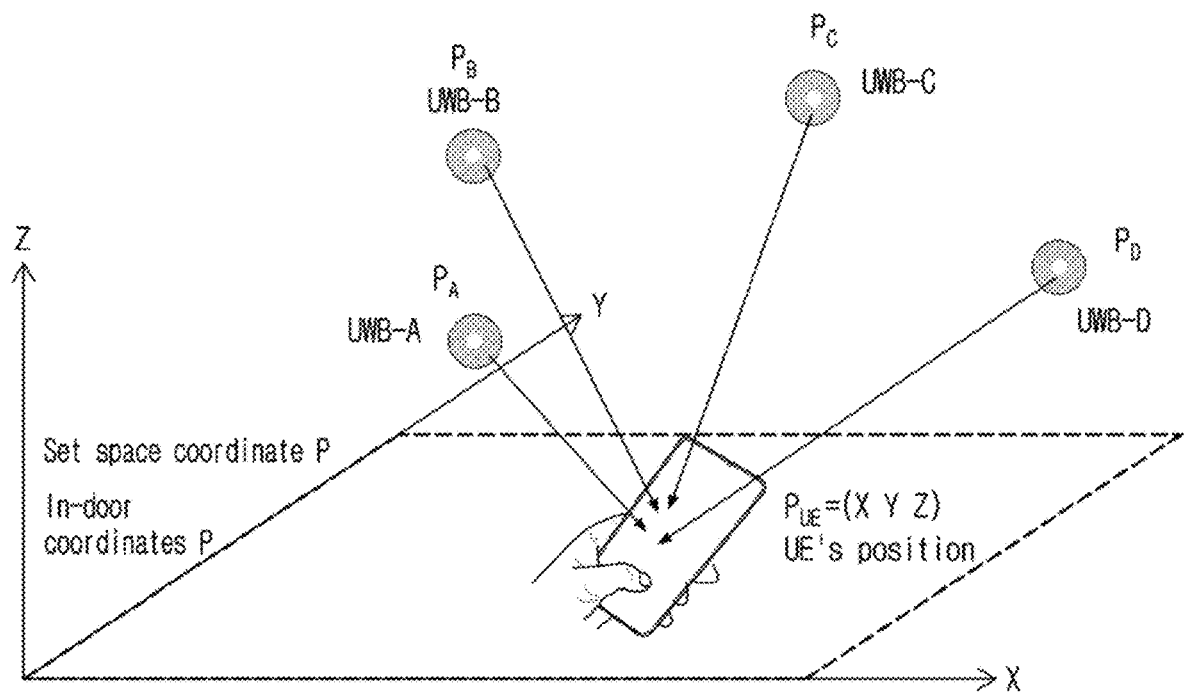
FIG. 9 is a schematic diagram showing UE position information in a set space coordinate system according to an example embodiment of the disclosure.

As shown in FIG. 9, according to an example embodiment, when determining the position information P of each of UWB devices in the set space coordinate system and the relative position information (polar coordinate information) ρ between the UE and each of UWB devices, the position information of the UE is determined by following Math Figure 1:

$$P_{UE} = P + \rho \qquad \text{[Math Figure 1]}$$

Figure 10:
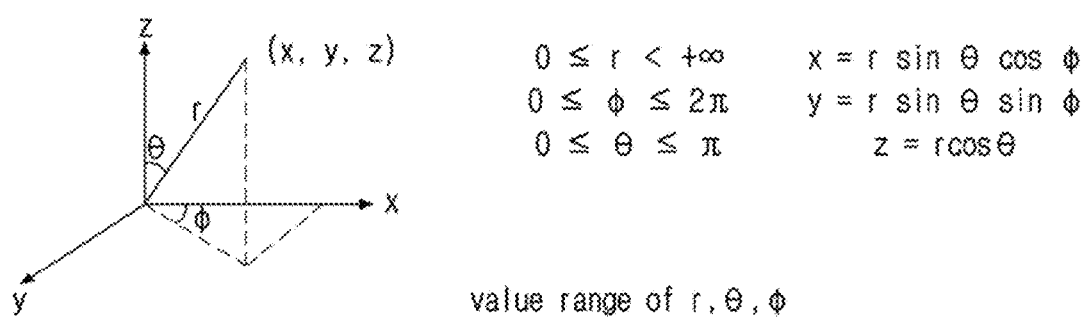
FIG. 10 is a schematic diagram of a conversion process from a polar coordinate to a rectangular coordinate provided in an example embodiment of the disclosure.

The coordinate conversion from a polar coordinate to a rectangular coordinate is illustrated according to an example embodiment in FIG. 10. Considering that there may be multiple UWB devices, the average value of multiple pieces of position information of the UE determined based on UWB devices may be taken as the final position information of the UE. The position information of the UE is marked as $P_{UE} = (X, Y, Z)$.

Figure 11:
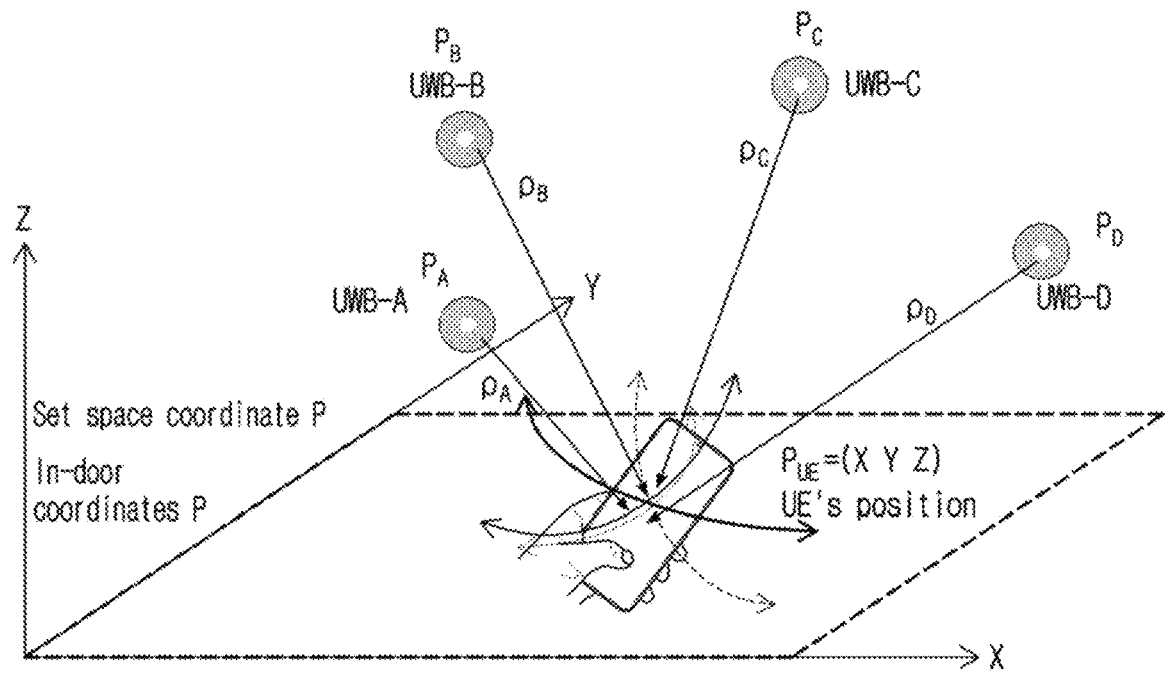
FIG. 11 is a schematic diagram of determining position information of a UE according to an example embodiment of the disclosure.

FIG. 11 illustrates the specific execution process of the above operation A1 according to another example embodiment from another perspective:

For the UWB-A, draw a sphere with UWB-A position ($P_A$) as center $r_A$ and $\rho_A(r_A, \theta_A, \phi_A)$ from as radius.
For the UWB-B, draw a sphere with UWB-B position ($P_B$) as center $r_B$ and $\rho_B(r_B, \theta_B, \phi_B)$ from as radius.
For the UWB-C, draw a sphere with UWB-C position ($P_C$) as center $r_C$ and $\rho_C(r_C, \theta_C, \phi_C)$ from as radius.
For the UWB-D, draw a sphere with UWB-D position ($P_D$) as center $r_D$ and $\rho(r_D, \theta_D, \phi_D)$ from as radius.

After the four spherical arcs are determined based on the four UWB devices, an intersection of the four spherical arcs is taken as the position of the UE, marked as $P_{UE} = (X, Y, Z)$.

In operation A2, the UE pointing information is determined based on the position information of the UE.

The following describes the basic conditions required for the execution of operation A2 according to an example embodiment.

Figure 12:
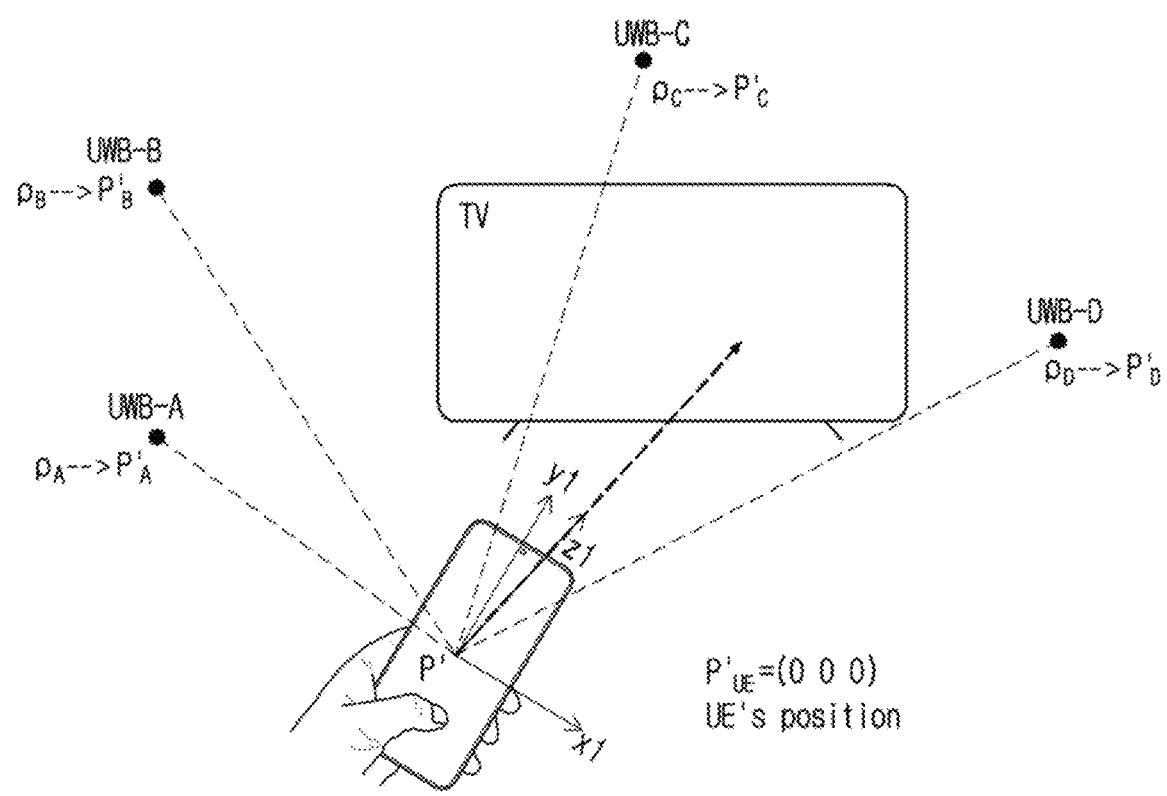
FIG. 12 is a schematic diagram showing the relative positions of devices in a UE measure coordinate system according to an example embodiment of the disclosure.

In combination with the foregoing example embodiments describing operation A1, the corresponding UE measure coordinate may be determined based on polar coordinates. In the coordinate system corresponding to the UE measure coordinate, the origin is the position of the UE, the X axis is parallel to the width direction of the UE, the Y axis is parallel to the length direction of the UE, and the Z axis is perpendicular to the setting plane of the UE. The UE measure coordinate is marked as P' as shown in FIG. 12.

Figure 13:
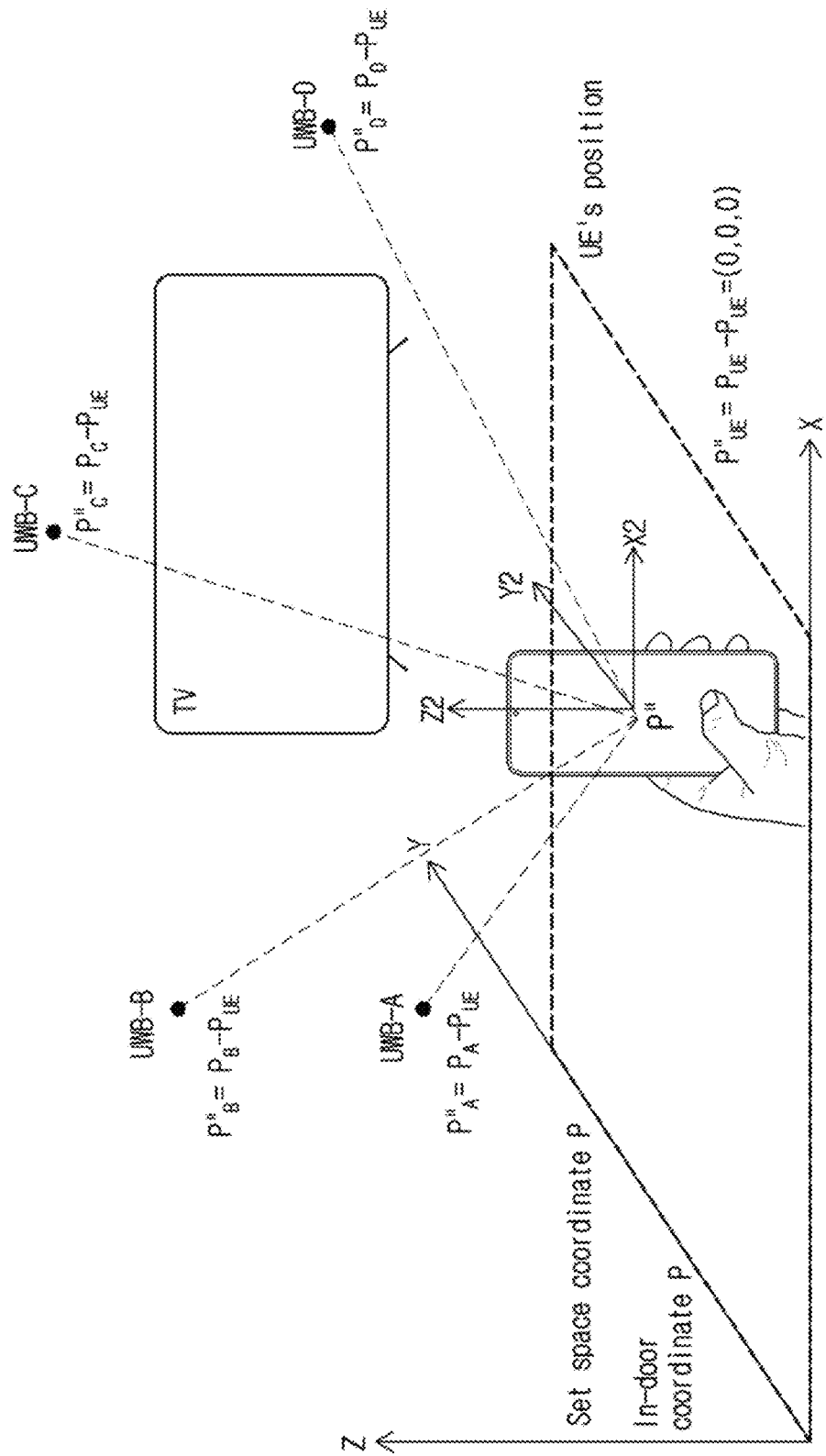
FIG. 13 is a schematic diagram showing absolute positions of devices in a UE reference coordinate system according to an example embodiment of the disclosure.

With reference to the foregoing embodiment ample embodiments describing operation A1, a corresponding UE reference coordinate may be determined based on the set space coordinate. In the coordinate system corresponding to the UE reference coordinate, the origin is the position of the UE, and each of coordinate axes is parallel to the corresponding coordinate axes of the set space coordinate system. The UE reference coordinate is marked as P'' as shown in FIG. 13.

The UE measure coordinate and UE reference coordinate are Cartesian coordinates.

According to an example embodiment, the UE pointing information may be determined by calculating the rotation relationship between the UE measure coordinate and the UE reference coordinate.

According to an example embodiment, the determining the UE pointing information based on the position information of the UE in the operation A2 includes the following operation A21-A23:

According to an example embodiment, operation A21 includes determining measurement position information of the UE and each of the UWB devices in a UE measure coordinate system respectively.

As shown in FIG. 12, in the UE measure coordinate, through the conversion of polar coordinate to Cartesian coordinate, the measurement position information of the UWB device may be calculated, where the measurement position information may represent the relative position of the UWB device (and UE-related relative position), where the UE measure coordinate may be marked as P'=(x1, y1, z1), the measurement position information of each of UWB devices may be marked as $P'_A$, $P'_B$, $P'_C$ and $P'_D$.

It can be understood that since the origin of the UE measure coordinate system is the position of the UE, then $P'_{UE}=(0, 0, 0)$. For example, when the UE measure coordinate system is compared with the set space coordinate system, whether the UE measure coordinate system is inclined depends on the direction in which the UE points.

According to an example embodiment, operation A22 includes determining reference position information of the UE and each of the UWB devices in a UE reference coordinate system respectively.

As shown in FIG. 13, in the UE reference coordinate system, by converting the indoor coordinate to the UE reference coordinate, the reference position information of the UWB devices may be calculated, where the reference position information may represent the absolute position of the UWB devices. The conversion from the set space coordinate to the UE reference coordinate may be performed with reference to the following Math Figure 2:

$$P''=P-1 \qquad \text{[Math Figure 2]}$$

Here, $t=P_{UE}$, that is, P" may be understood as a translation vector.

Also, the UE reference coordinate may be marked as P"=(x2, y2, z2) and the measurement position information of UWB devices may be marked as $P''_A$, $P''_B$, $P''_C$ and $P''_D$.

It can be understood that since the origin of the UE reference coordinate system is the position of the UE, then $P''_{UE}=(0, 0, 0)$.

According to an example embodiment, operation A23 includes determining the UE pointing information based on the measurement position information and the reference position information of the UE and each of the UWB devices.

Figure 14:
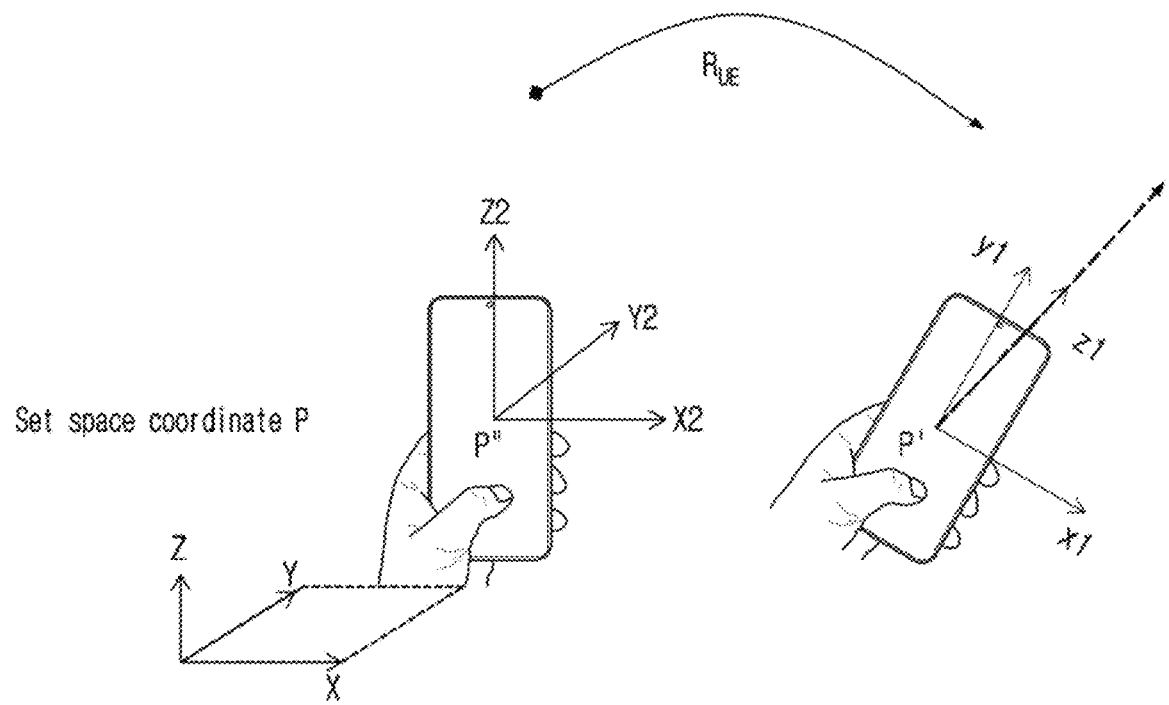
FIG. 14 is a schematic diagram of a coordinate for calculation of a rotation matrix provided in an example embodiment of the disclosure.

As shown in FIG. 14, the rotation matrix of the coordinate may be calculated by a matrix division to determine the UE pointing information. For example, the calculation expression of the rotation matrix $R_{UE}$ is shown in the following Math Figure 3:

$$R_{UE}=P'[UE,A,B,C,D]/P''[UE,A,B,C,D] \qquad \text{[Math Figure 3]}$$

It is understandable that $P''*R_{UE}=P'$. That is, the embodiment of the disclosure may use a rotation matrix $R_{UE}$ to represent the direction the UE points.

According to an example embodiment, in order to effectively control the calculation amount of the UE and reduce the loss caused by excessive amount of calculation, when the number of UWB devices is greater than or equal to a preset value, the operation A23 may be adopted to determine UE pointing information. On the other hand, when the number of UWB devices is less than a preset value, the UE pointing information may be estimated through inertial measurement unit (IMU) and UWB. Here, the preset value may be determined based on empirical values.

According to an example embodiment, the following describes the specific execution process of the above operation A2 from another perspective:

Operation a: In the UE measure coordinate P' (the origin is the position of the UE, the X axis is parallel to the screen width of the UE, the Y axis is parallel to the screen length of the UE, and the Z axis is perpendicular to the screen of the UE), by the conversion of a polar coordinate to a Cartesian coordinate ρ→P', the relative positions $P'_A$, $P'_B$, $P'_C$ and $P'_D$ of UWB-A, UWB-B, UWB-C, and UWB-D in the UE measure coordinate system may be obtained.

Operation b: In the UE reference coordinate P" (the origin is the position of the UE, and the X, Y, and Z axes are parallel to the X, Y, and Z axes of the set space coordinate system), by the conversion of the set space coordinate to the UE reference coordinate, the absolute position $P''_A$, $P''_B$, $P''_C$ and $P''_D$ of UWB-A, UWB-B, UWB-C and UWB-D in the UE reference coordinate system may be obtained.

Operation c: Based on operations a and b, the rotation matrix of coordinate P"→P' is calculated by a matrix division to obtain UE pointing information.

In order to better illustrate the embodiments of the disclosure, the following takes two-dimensional coordinates as an example to illustrate the processing process of UE pointing information.

With reference to FIGS. 15A-15D, it may be understood that through an inclined angle Θ of X1 and X2, a two-dimensional direction of the UE based on the set space coordinate system may be obtained. However, considering the actual application in a three-dimensional space, the UE pointing information is determined through the process of rotating to a three-dimensional coordinate.

Figure 15A:
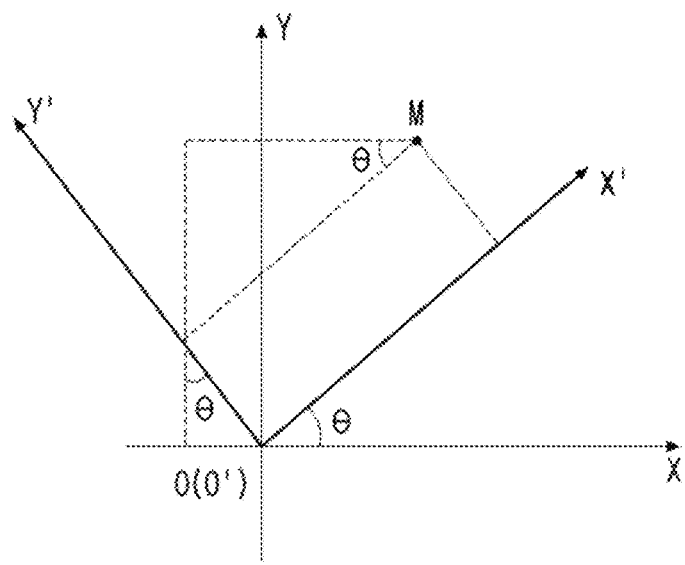
FIG. 15A is a schematic diagram of a two-dimensional coordinate rotation provided in an example embodiment of the disclosure.
Figure 15B:
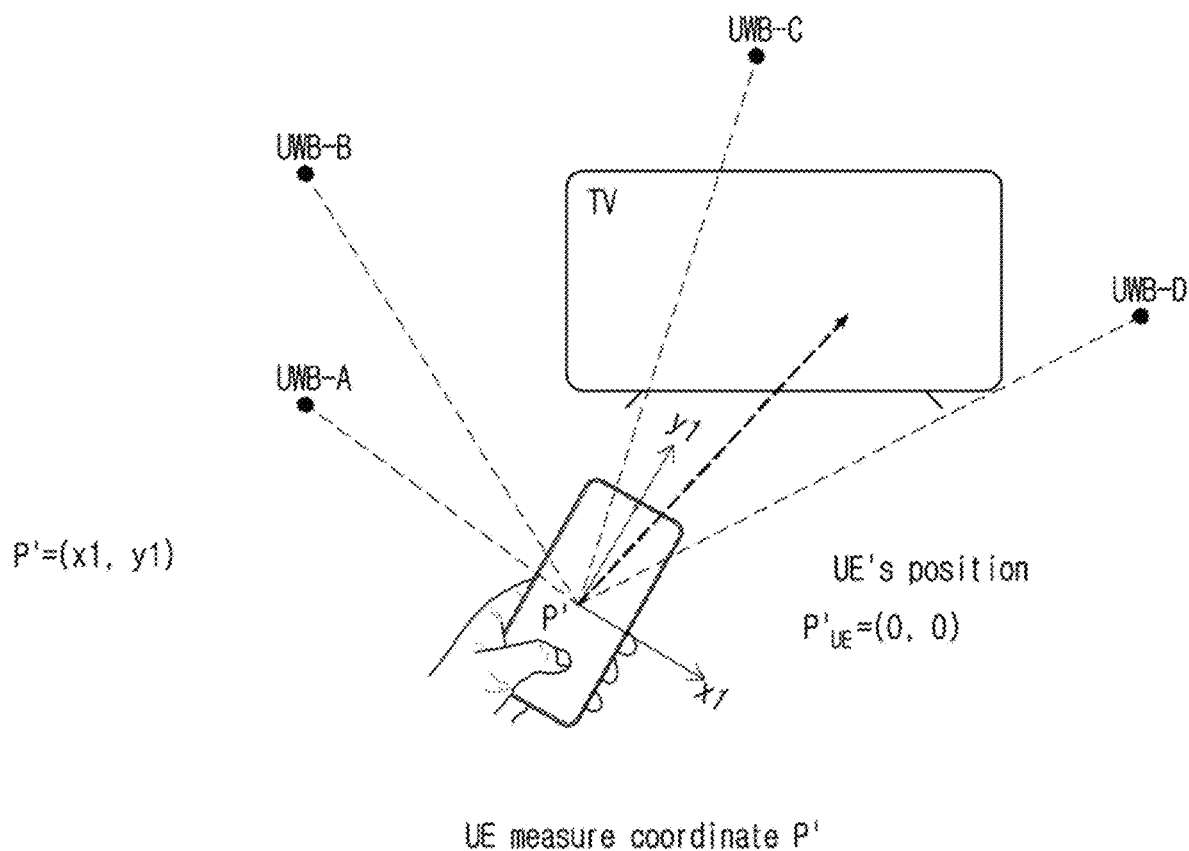
FIG. 15B is a schematic diagram of a two-dimensional UE measure coordinate system provided in an example embodiment of the disclosure.
Figure 15C:
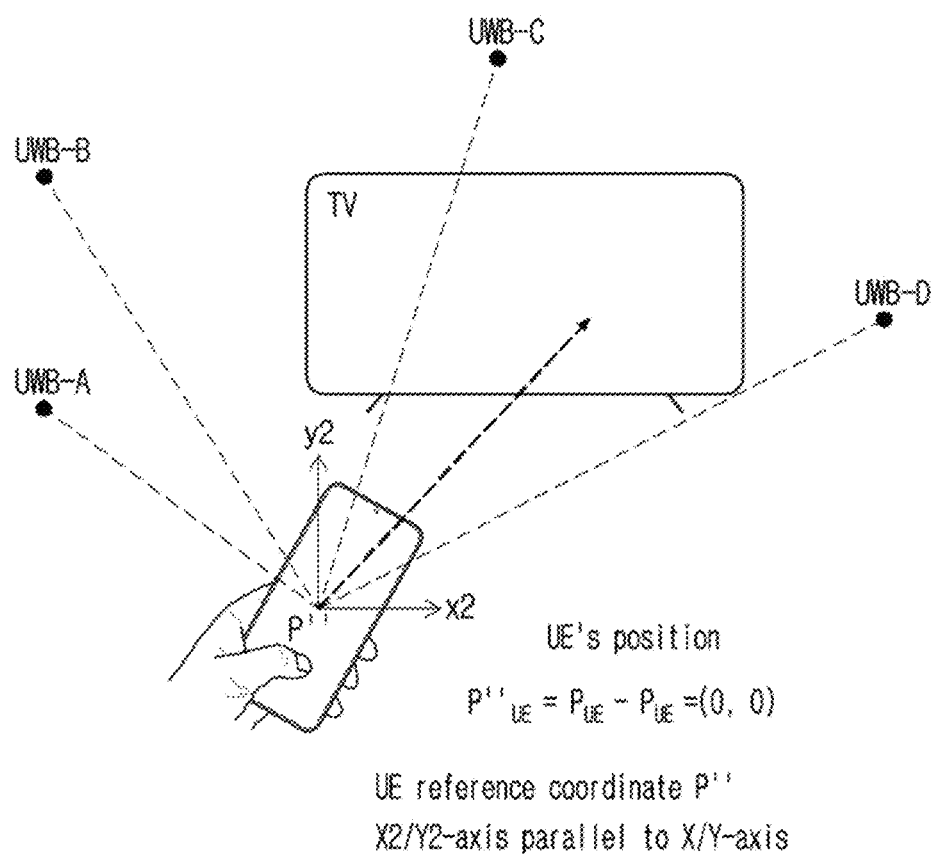
FIG. 15C is a schematic diagram of a two-dimensional UE reference coordinate system provided in an example embodiment of the disclosure.
Figure 15D:
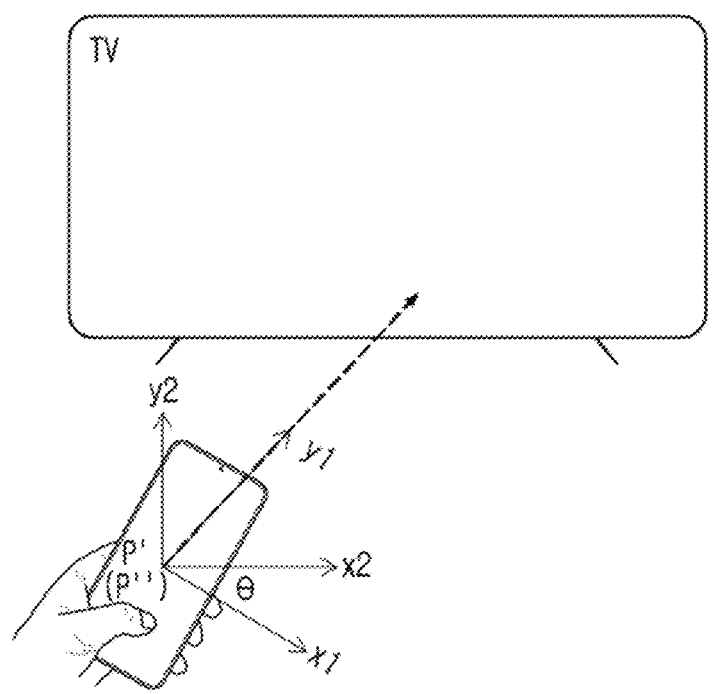
FIG. 15D is a schematic diagram of determining UE pointing information according to an example embodiment of the disclosure.

As shown in FIG. 15A, the rotation calculation process of the two-dimensional coordinate may refer to the following Math Figure 4:

$$\begin{cases} X = X' \cdot \cos\theta - Y' \cdot \sin\theta \\ Y = X' \cdot \sin\theta + Y' \cdot \cos\theta \end{cases} \qquad \text{[Math Figure 4]}$$

Here, for the position M (X, Y) in FIG. 15A, the relationship between the two coordinates may be expressed as the Math Figure 5:

$$\begin{bmatrix} X \\ Y \end{bmatrix} = \begin{bmatrix} \cos\theta & -\sin\theta \\ \sin\theta & -\cos\theta \end{bmatrix} \begin{bmatrix} X' \\ Y' \end{bmatrix} \text{ or} \qquad \text{[Math Figure 5]}$$

$$\begin{bmatrix} X' \\ Y' \end{bmatrix} = \begin{bmatrix} \cos\theta\sin\theta \\ -\sin\theta\cos\theta \end{bmatrix} \begin{bmatrix} X \\ Y \end{bmatrix}$$

It may be understood that the left side of the formula (5) is embodied as the conversion from coordinate O-XY to O-X'Y'; and the right side is embodied as the conversion from coordinate O-XY to O-X'Y'.

Accordingly, the rotation calculation process of the three-dimensional space coordinate is given below (the rotation calculation process may refer to the related technologies and will not be repeated herein), referring to the following Math Figure 6:

$$\begin{bmatrix} X' \\ Y' \\ Z' \end{bmatrix} = \begin{bmatrix} \cos\theta_3 & \sin\theta_3 & 0 \\ -\sin\theta_3 & \cos\theta_3 & 0 \\ 0 & 0 & 1 \end{bmatrix} \begin{bmatrix} \cos\theta_2 & 0 & -\sin\theta_2 \\ 0 & 1 & 0 \\ \sin\theta_2 & 0 & \cos\theta_2 \end{bmatrix} \qquad \text{[Math Figure 6]}$$

-continued $$\begin{bmatrix} 1 & 0 & 0 \\ 0 & \cos\theta_1 & \sin\theta_1 \\ 0 & -\sin\theta_1 & \cos\theta_1 \end{bmatrix} \begin{bmatrix} X \\ Y \\ Z \end{bmatrix}$$

It can be understood that the formula (6) represents the process of conversion from the coordinate O-XYZ to O'-X'Y'Z'.

According to an example embodiment, the UE pointing information determined in operation S101 may be stored in a spatial device relationship table, which is convenient for subsequent use by the same UE or by other UEs. The spatial device relationship table may be used to record the spatial information, ID, control entrance, etc. of each of devices However, the disclosure is not limited thereto, and as such, other forms may be used to record other than the table.

The following describes the specific process for determining a target non-device pointed to by a UE.

According to an example embodiment, the determining a target non-UWB device pointed to by the UE based on the UE pointing information and spatial information of at least one non-UWB device in operation S102 includes the following operation S1021.

According to an example embodiment, operation S1021 includes determining a candidate non-UWB device(s) pointed to by the UE, based on the UE pointing information and the spatial information of at least one non-UWB device, and determining the target non-UWB device pointed to by the UE among the candidate non-UWB device(s).

Specifically, considering that there are many non-UWB devices in the space, the distance between non-UWB devices may be small, the UE may point to one or more non-UWB device at the same time, when determining a target non-UWB device pointed to by the UE based on the UE pointing information and spatial information of non-UWB devices. Therefore, according to an example embodiment of the disclosure, in order to improve the accuracy of the determined target non-UWB device, the non-UWB devices determined based on the UE pointing information and the spatial information of the non-UWB devices are used as candidate non-UWB devices, and the target non-UWB device pointed to by the UE is determined by further screening for the candidate non-UWB devices.

According to an example embodiment, the determining a candidate non-UWB device(s) pointed to by the UE based on the UE pointing information and spatial information of at least one non-UWB device in operation S1021 includes the following operations B1-B2:

According to an example embodiment, operation B1 includes acquiring spatial information of at least one non-UWB device, wherein the spatial information of at least one non-UWB device includes position information and/or picking-region information of the at least one non-UWB device.

For example, a spatial device relationship table may be used to record information such as device ID, spatial information, and control entrance. The spatial information and control entrance of non-UWB devices may be recorded in the IoT application. The spatial information in the table may be saved in the format of absolute spatial information, which may specifically include position, picking-region, and device size, etc. The device size may be length, width and height of a device. The control entrance is the control entrance of the IoT application of the device, such as an entrance set for being adapted to a specific application, and an entrance set for being adaptable to any user-defined shortcut.

The spatial device relationship table is shown in Table 1 below:

TABLE 1

| ID | Spatial information | Device control entrance |
|---|---|---|
| TVID: 001 | Position: P(x, y, z)<br>Picking region: circle (P, R) | 1. TV switch control entrance.<br>2. Share screen entrance. |
| ... | ... | ... |

In the table 1, P denotes position, and R denotes a radius.

The picking-region may be expressed in various regular or irregular shapes such as circles, squares, and rectangles. According to an example embodiment, the picking-region of all non-UWB devices may be recorded in the same shape, or different shapes to adapt to the characteristics of different non-UWB devices.

According to an example embodiment, the position of the non-UWB device may also be preset, and the user may obtain it by any of the following methods:

Method 1: Guiding the user to take a UE with UWB function close to a non-UWB device, and measuring the spatial information of non-UWB devices manually through the spatial relationship between the UE and neighboring UWB devices, based on UWB ranging and UWB angle measurement (AOA, TOF, etc.) functions.

Method 2: Making drones or robots with UWB function move close to non-UWB devices by using WI-FI received signal strength indication (RSSI), and obtaining the spatial information of non-UWB devices through UWB ranging and angle measurement function.

According to an example embodiment, the picking-region may be set according to the physical size (length, width, etc.) of the device which is obtained by the UE. When the size of the device is different, the picking-region may be different. The larger the size, the larger the picking-region may be set. It is understandable that both UWB devices and non-UWB devices have corresponding picking-regions.

According to an example embodiment, the UE may obtain the physical size of the device in the following manner:

1. The user directly manually measures the physical size of the device, and inputs the physical size of the device into the UE.
2. The user directly inputs model information of the device, and the UE searches for the physical size of the device in the network according to the model information.
3. When registering a non-UWB device, the device may be firstly connected via Bluetooth, the UE may obtain the name of the device containing the model information of the device through a Bluetooth connection, and the UE may search for the physical size of the device in the network according to the model information.

According to an example embodiment, operation B2 includes, if the UE pointing information intersects a picking-region of any of at least one non-UWB device, or a deviation between the UE pointing information and a direction of the UE position to a position of any of at least one non-UWB device is within a preset deviation range, determining the non-UWB device as a candidate non-UWB device pointed to by the UE.

For instance, the example embodiment of the disclosure first determines a ray corresponding to the UE based on the UE pointing information, and the ray expression shown in the following Math Figure 7 may be used to determine the UE ray $T_{UE}$.

$$T_{UE}(n)=P_{UE}+R_{UE}*n \quad \text{[Math Figure 7]}$$

Here, n is the distance from the UE to a non-UWB device, which may be obtained by vision sensors of computer vision and/or LIDAR. It is understandable that the end point of the UE ray is the position of the UE, and the direction of the UE ray is the direction the UE points (UE pointing information).

Figure 16:
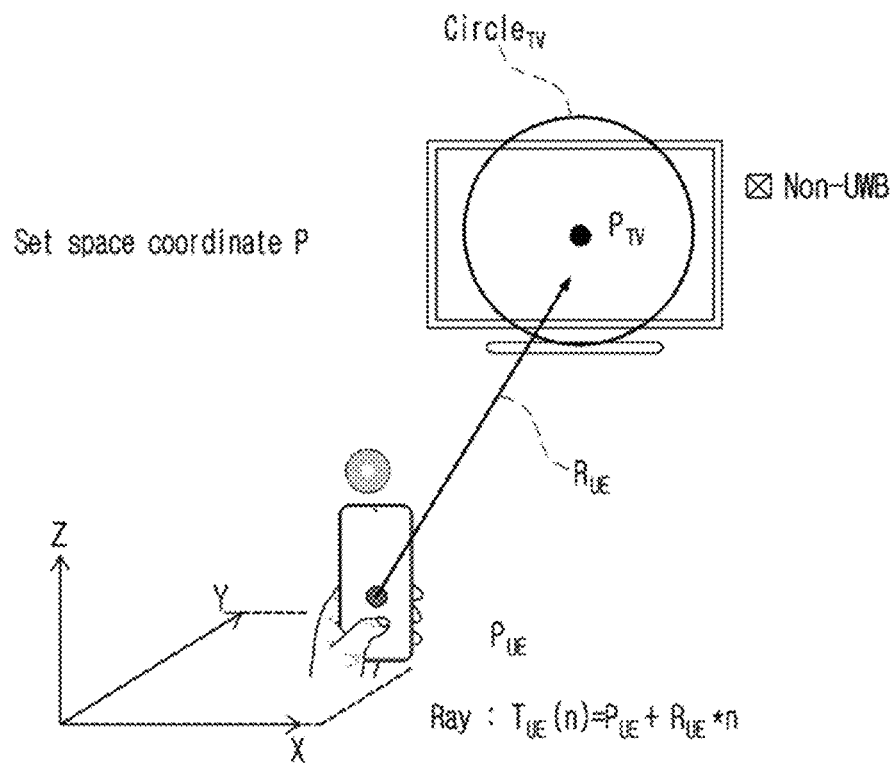
FIG. 16 is a schematic diagram of determining a target non-UWB device pointed to by a UE according to an example embodiment of the disclosure.

According to an example embodiment illustrated in FIG. 16, assuming that the current UWB environment includes a non-UWB device TV, the position and picking-region of the non-UWB device TV may be obtained in operation B1, based on whether the UE ray and the corresponding picking-region of the TV intersect may be determined, or whether the deviation between the directions of the UE ray and a line segment $P_{UE}P_{TV}$ is within a preset deviation range may be determined, after the line segment $P_{UE}P_{TV}$ is determined based on the position information of the UE and the position information of the TV. Here, the direction deviation may be determined by an inclined angle between the UE ray and the line segment $P_{UE}P_{TV}$ and the preset deviation range is an angle range. In FIG. 16 the UE ray and the corresponding picking-region of the TV intersect.

According to an example embodiment, when the UE ray intersects the picking-region of any of non-UWB devices, or the deviation between of direction of the UE ray and the direction from the UE position to the position of any of non-UWB devices is within a preset deviation range, the non-UWB device is determined as a candidate non-UWB device pointed to by the UE, and the ID of the corresponding device is returned to the UE. According to an example embodiment, the ID returning operation may also be performed when the target non-UWB device is determined.

According to an example embodiment, considering that in the UWB environment, multiple non-UWB devices may be close to each other or one or more non-UWB devices may block other non-UWB devices, the UE cannot point to only one non-UWB device (that is, there is ambiguity as to which of the non-UWB devices the UE is pointed at), which affects user experience. According to an example embodiment, there is provided methods to solve the ambiguity. For example, when the number of candidate non-UWB devices determined in operation B2 is greater than 1, the determining the target non-UWB device pointed to by the UE among the candidate non-UWB devices includes the following operations B21-B22:

According to an example embodiment, operation B21 includes adjusting the picking-region corresponding to each of candidate non-UWB devices based on overlapping of picking-regions corresponding to candidate non-UWB devices, and determining the target non-UWB device pointed to by the UE based on the adjusted picking-region.

When there is overlapping region between the picking-regions corresponding to candidate non-UWB devices in left and right, or upper and lower directions, it means that the number of candidate non-UWB devices determined by the intersection of the UE pointing information and the picking-region of any of non-UWB devices is greater than 1.

Figure 17A:
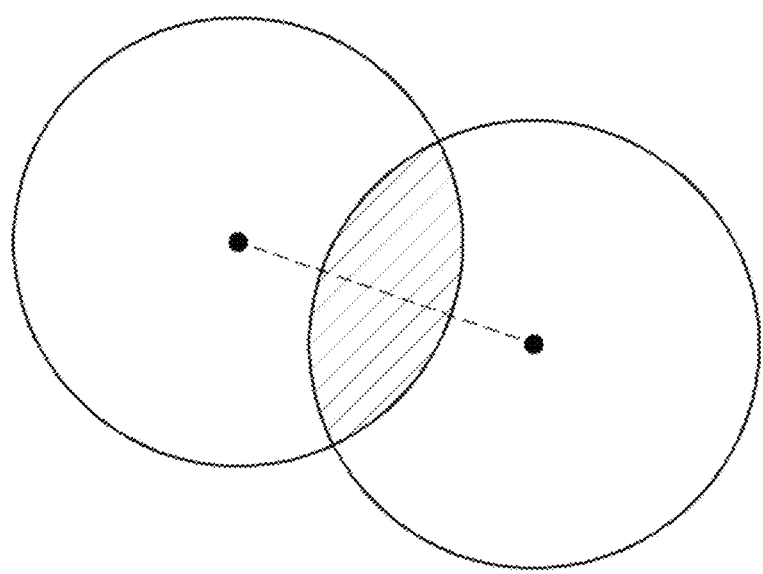
FIG. 17A is a schematic diagram of ambiguity of a non-UWB device provided in an example embodiment of the disclosure.

For example, as shown in FIG. 17A, there is the overlapping region (the shaded portion) of the picking-regions corresponding to currently two candidate non-UWB devices in the left and right or the upper and lower directions, the size of one of the picking-regions may be reduced and the size of the another of picking-regions may be increased to obtain the smallest overlapping region between the two picking-regions. At this time, the operation of determining the intersection relationship between the UE ray and the adjusted picking-region of each of candidate non-UWB devices may be further performed, and the candidate non-UWB device corresponding to the adjusted picking-region that uniquely intersects with the UE ray is used as the target non-UWB device that the UE points to.

Figure 17B:
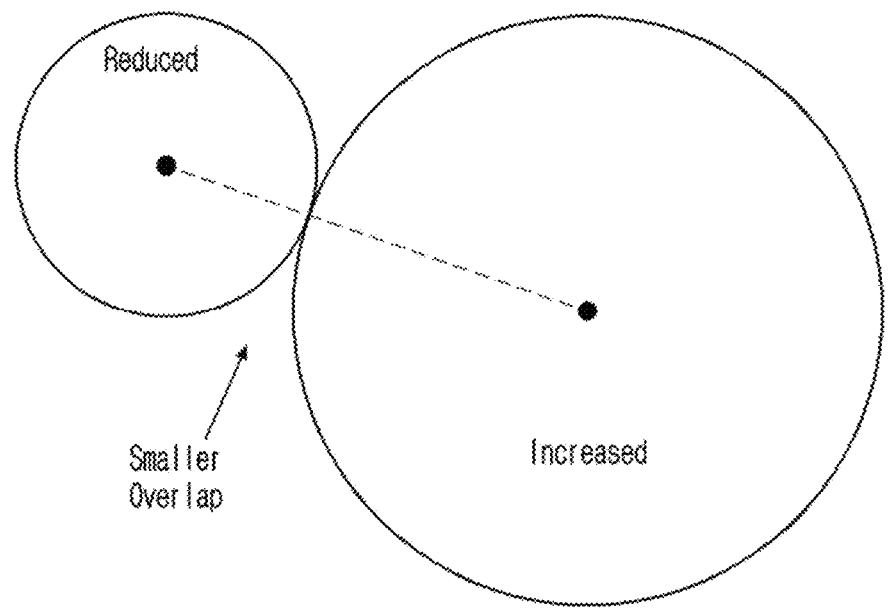
FIG. 17B is a schematic diagram of solving ambiguity of non-UWB devices according to an example embodiment of the disclosure.

FIG. 17B shows that there is no overlapping region in the picking-regions corresponding to the two candidate non-UWB devices after adjustment. According to an example embodiment, there may still be an overlapping region between the adjusted picking-regions corresponding to the two candidate non-UWB devices, but the overlapping region is small enough to no longer affect the determination of the target non-UWB device.

According to an example embodiment, operation B22 includes displaying movement guidance information corresponding to when pointing to each of the candidate non-UWB devices on the user interface based on the overlapping of picking-regions corresponding to the candidate non-UWB devices, and determining the target non-UWB device pointed to by the UE based on a current movement information of the UE.

When there is an overlapping region in the front and rear directions between the picking-regions corresponding to candidate non-UWB devices, it means that the number of candidate non-UWB devices determined by the deviation between the UE pointing information and the direction from the UE position to the position of any of non-UWB devices is greater than 1.

Figure 18:
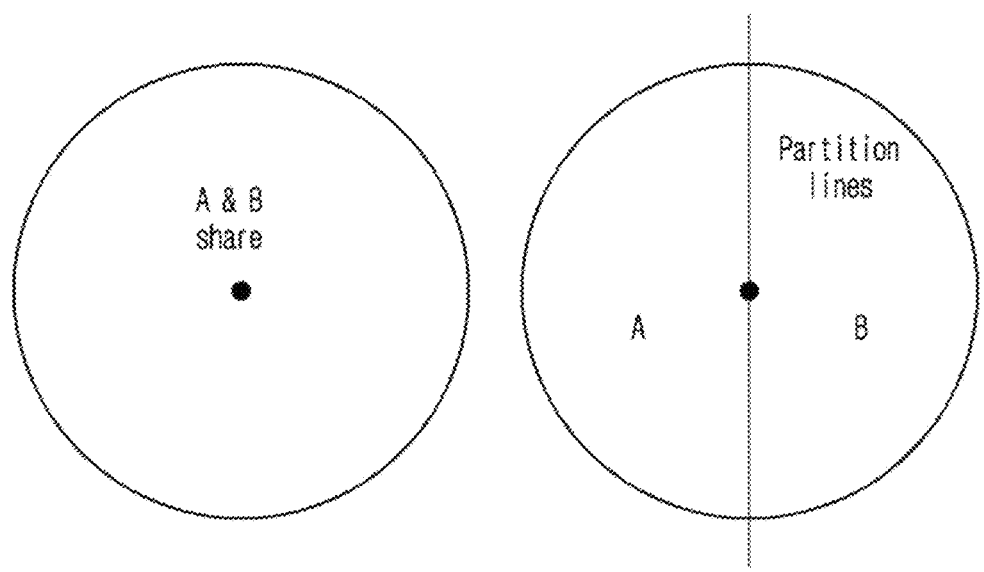
FIG. 18 is a schematic diagram showing that picking-regions of non-UWB devices overlap each other in front and rear directions according to an example embodiment of the disclosure.
Figure 19:
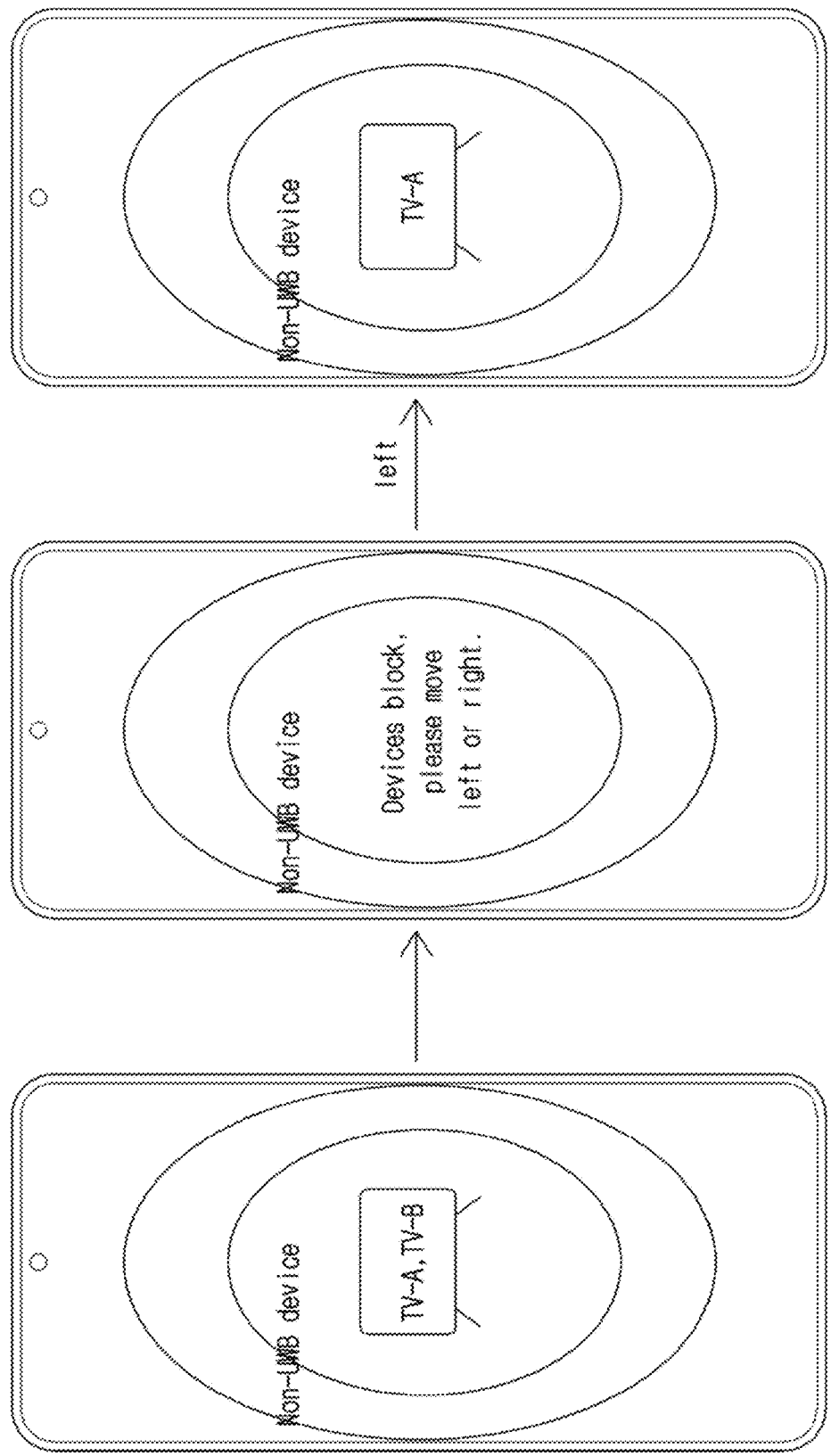
FIG. 19 is a schematic flowchart of an UI interface switching provided in an example embodiment of the disclosure.

According to an example embodiment illustrated in FIG. 18, when the picking-regions corresponding to candidate non-UWB devices A and B share the same region, that is, when one device completely covers another device in the front and back directions, a partition line may be established based on the picking points (centers) of the picking-regions, and it may be preset that the left region divided by the partition line corresponds to a device A, and the right region divided by the partition line corresponds to a device B. Accordingly, combined with the user interface (UI) change process shown in FIG. 19, it can be understood that: the picking-regions corresponding to the candidate non-UWB devices (TV-A and TV-B) pointed to by the UE overlap or block each other in the front and rear directions. At this time, the user interface may display the movement guidance information when the UE points to each of candidate non-UWB devices, such as displaying the corresponding moving direction when pointing to the device A and the corresponding moving direction when pointing to the device B, or displaying the device A on the left side of the interface, displaying the device B on the right side of the interface. According to an example embodiment, the movement guidance information may also be text information, as shown in FIG. 19, the text content of "There are overlapping devices, please move left or right" displayed on the user interface. When it is detected that the UE moves to the left, it is determined that the device A is the target non-UWB device pointed to by the UE; when it is detected that the UE moves to the right, it is determined that the device B is the target non-UWB device pointed to by the UE.

According to an example embodiment, when the number of candidate non-UWB devices is determined as 1 in operation B2, the candidate non-UWB device may be determined directly as the target non-UWB device pointed to by the UE.

Figure 20:
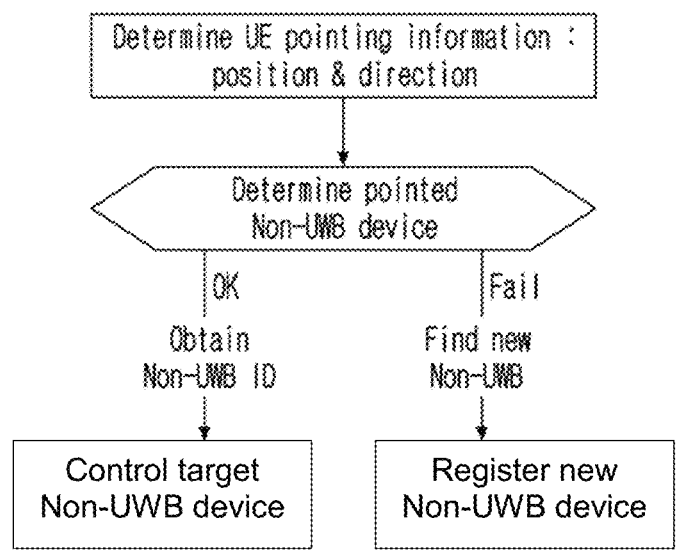
FIG. 20 is a schematic flowchart of a method for determining a device pointed to by UE according to an example embodiment of the disclosure.
Figure 21:
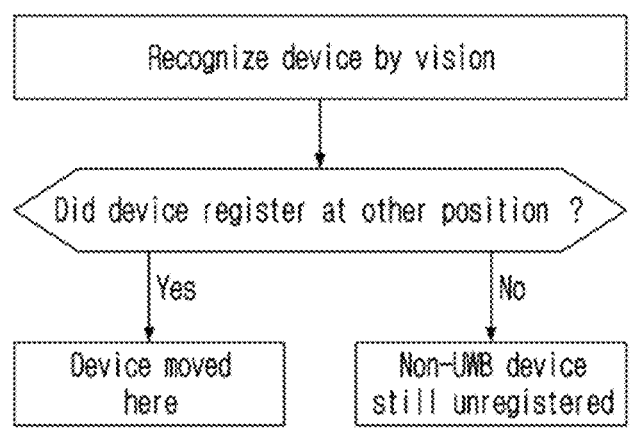
FIG. 21 is a block diagram of a process for identifying a non-UWB device according to an example embodiment of the disclosure.

According to an example embodiment, when the number of candidate non-UWB devices is determined as 0 in operation B2, it means that the current UE pointing to the non-UWB device fails. That is, the identifying of the non-UWB device fails. As shown in FIG. 20 and FIG. 21, in a case, the identifying of the non-UWB device fails, the method may include an operation of registering a new non-UWB device. At this time, the following operations of identifying the non-UWB device as shown in operation C1-C2 below will be performed.

According to an example embodiment, operation C1 includes identifying an unregistered non-UWB device, and acquiring spatial information of the unregistered non-UWB device, and re-performing the operation of determining a target non-UWB device pointed to by the UE based on the UE pointing information and spatial information of at least one non-UWB device.

According to an example embodiment, operation C2 includes identifying a non-UWB device that has moved, displaying corresponding movement guidance information corresponding to when pointing to the non-UWB device that has moved on a user interface, and in response to an operation event of the UE pointing information moving to an original position of the non-UWB device, determining the non-UWB device that has moved as the target non-UWB device pointed to by the UE.

As shown in FIG. 21, operation C1 corresponds to a processing procedure of identifying an unregistered device based on a visual recognition device, and operation C2 corresponds to a processing procedure of identifying a mobile device based on a visual recognition device.

Specifically, identifying non-UWB devices that have not registered spatial information and identifying non-UWB devices with unknown movements may be achieved by using image detection technology. For example, a UE's camera device may be used as a visual recognition device, and an image detection technology may be used to perform identifying and processing to the collected images. Further, identifying non-UWB devices that have not registered spatial information based on the collected image information. For example, the identifying process may include obtaining an image A collected at the current moment and comparing it with an image B obtained at the time when determining the device pointed to by the UE last time. If a non-UWB device that does not exist in the image B appears in the image A, the non-UWB device is determined to be a non-UWB device that has not registered spatial information; and if a non-UWB device in image B appears in different position in image A, the non-UWB device is determined as a non-UWB device that has moved.

In operation C1, the relevant information (such as ID, spatial information, control entrance, etc.) of non-UWB devices that have not registered spatial information needs to be entered into the spatial device relationship table. Before the information is entered, in the IoT application, the UE and the non-UWB device may be connected, and the connection mode may be BT or WI-FI.

Specifically, the acquiring spatial information of non-UWB devices that have not registered spatial information in operation C1 includes any one of the following operations C11-C12:

According to an example embodiment, operation C11 includes, in response to an operation event of placing the UE at the position of the unregistered non-UWB device, acquiring spatial information of the UE as the spatial information of the unregistered non-UWB device.

Figure 22A:
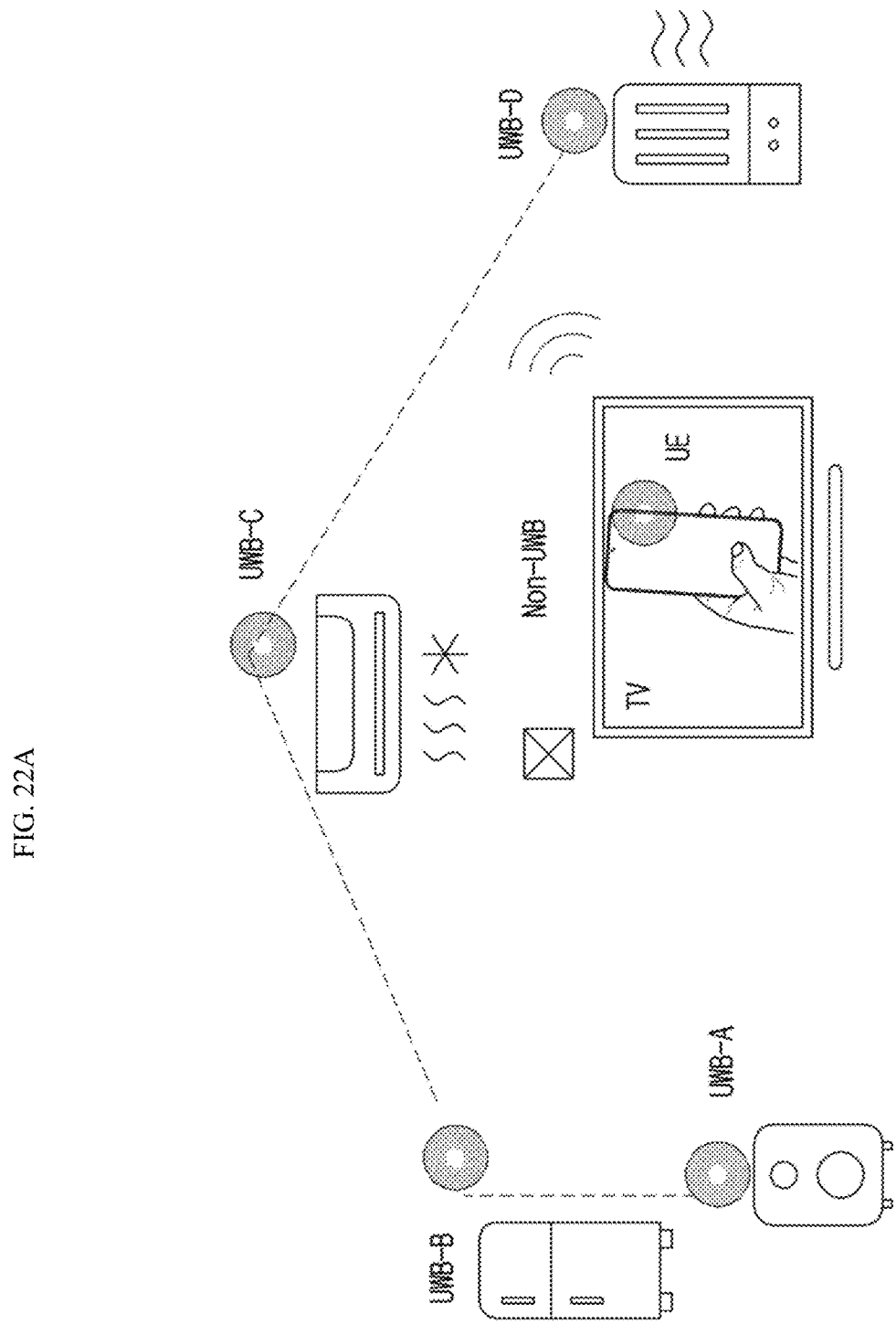
FIG. 22A is a schematic diagram of obtaining the position of a non-UWB device according to an example embodiment of the disclosure.
Figure 22B:
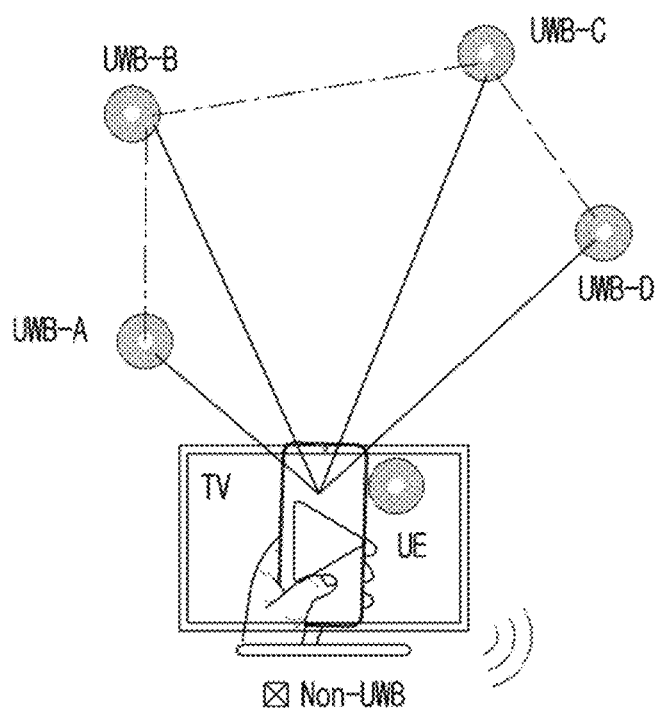
FIG. 22B is a schematic diagram of obtaining the position of a non-UWB device according to an example embodiment of the disclosure.

Specifically, as shown in FIGS. 21A and 22B, the user may be instructed to place the UE at the position of the non-UWB device to be registered. After the user completes the operation, the user may touch the relevant controls on UI interface, and use the UE's spatial information (which may include the UE's position information and the direction the UE points to) as the spatial information of the non-UWB device that has not registered the spatial information. The spatial information of the UE may be determined with reference to the process in operation S101. For example, the UE is placed in the position where the non-UWB device TV is located, and the spatial information of the non-UWB device TV is determined based on the UWB function of the UE and other UWB devices.

According to an example embodiment, a drone or robot with UWB function may also be used to automatically measure the spatial information of the non-UWB device to be registered and the obtained spatial information may also be fed back to the UE.

According to an example embodiment, operation C12 includes acquiring distance information between the UE and the unregistered non-UWB device, and determining the spatial information of the unregistered non-UWB device based on the distance information and the UE pointing information.

Figure 23:
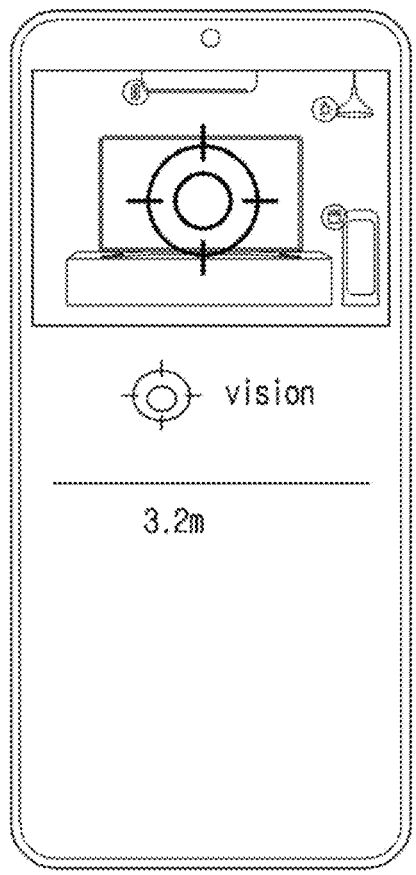
FIG. 23 is a schematic diagram of obtaining distance through vision and LIDAR according to an example embodiment of the disclosure.
Figure 23:
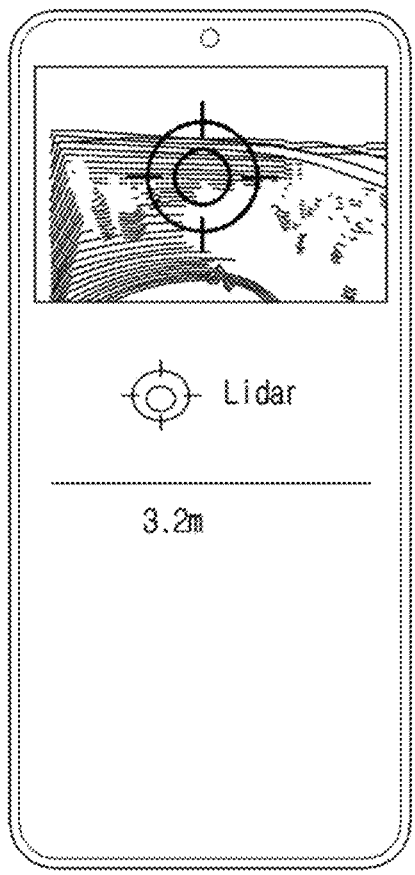

According to an example embodiment, acquiring the distance information between the UE and the non-UWB device that has not registered spatial information may be achieved by using one of the following methods:

The first method: measure the distance D from the UE to the non-UWB device through vision or LIDAR. As shown in FIG. 23, the currently measured non-UWB device is a TV, and the distance between the UE and the TV may be determined as 3.2 m through the vision or LIDAR on the UE.

Figure 24:
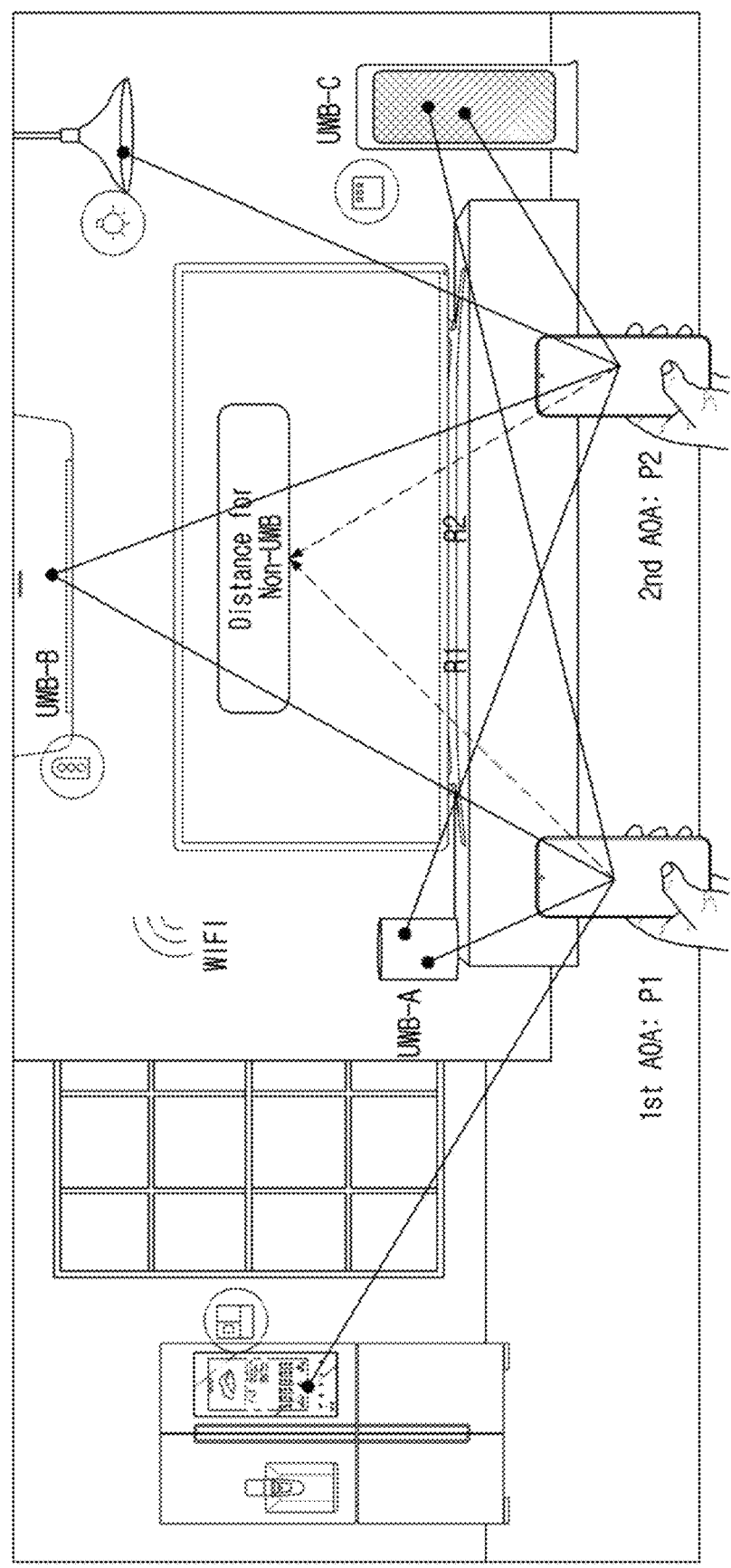
FIG. 24 is a schematic diagram of obtaining distance through multiple AOA measurements according to an example embodiment of the disclosure.

The second method: the distance D from the UE to the non-UWB device is measured by using the angle measurement function of UWB at different positions of the UE. Specifically, as shown in FIG. 24, the angle measurement may be performed at the first position and the second position respectively (which may be achieved by AOA, TOF, etc.), and then the UWB positioning algorithm is used to determine the absolute position P1 of the UE at the first position and the absolute position P2 at the second position. In addition, the direction of the UE to the non-UWB device may be determined through the UWB measurement, where the corresponding directions of different positions may be characterized by marking the rays R1 and R2 and then the center of the non-UWB device is determined based on the intersection of the rays R1 and R2 and the distance D from the UE to the non-UWB device is determined based on the position information of the UE determined in operation S101.

After obtaining the distance information between the UE and the non-UWB device that has not registered spatial information through the above method, the position information of the non-UWB device that has not registered spatial information (representing the absolute position) may be determined based on the above formula (7).

In operation C1, the ID and control entrance guide of the non-UWB device that has not registered spatial information may be obtained on the IoT application, and the corresponding control entrance may be set for the device according to the control entrance guide.

According to an example embodiment, according to the physical size of the non-UWB device that has not registered spatial information, a corresponding picking-region may be set for the non-UWB device and recorded in the spatial device relationship table.

Specifically, in operation C2, the identification process may determine the original position of the non-UWB device that has moved, and the user interface of the UE may display the corresponding movement guidance information corresponding to when pointing to the non-UWB device that has moved, where the information may be direction information that guides the user to move the UE to the original position. When it is detected that the direction the UE points to matches the displayed movement guidance information, that is, in response to the operation event that the UE pointing information moves to the original position of the non-UWB device, the non-UWB device that has moved is determined as the target non-UWB device that the UE points to.

According to an example embodiment, it is also possible to re-determine the current position information of the non-UWB device that has moved and update it to the spatial device relationship table.

According to an example embodiment, the method for determining a device pointed to by the UE further includes operation S103-S104:

According to an example embodiment, operation S103 includes acquiring a control entrance of the target non-UWB device.

According to an example embodiment, operation S104 includes controlling the target non-UWB device based on the control entrance.

Figure 25:
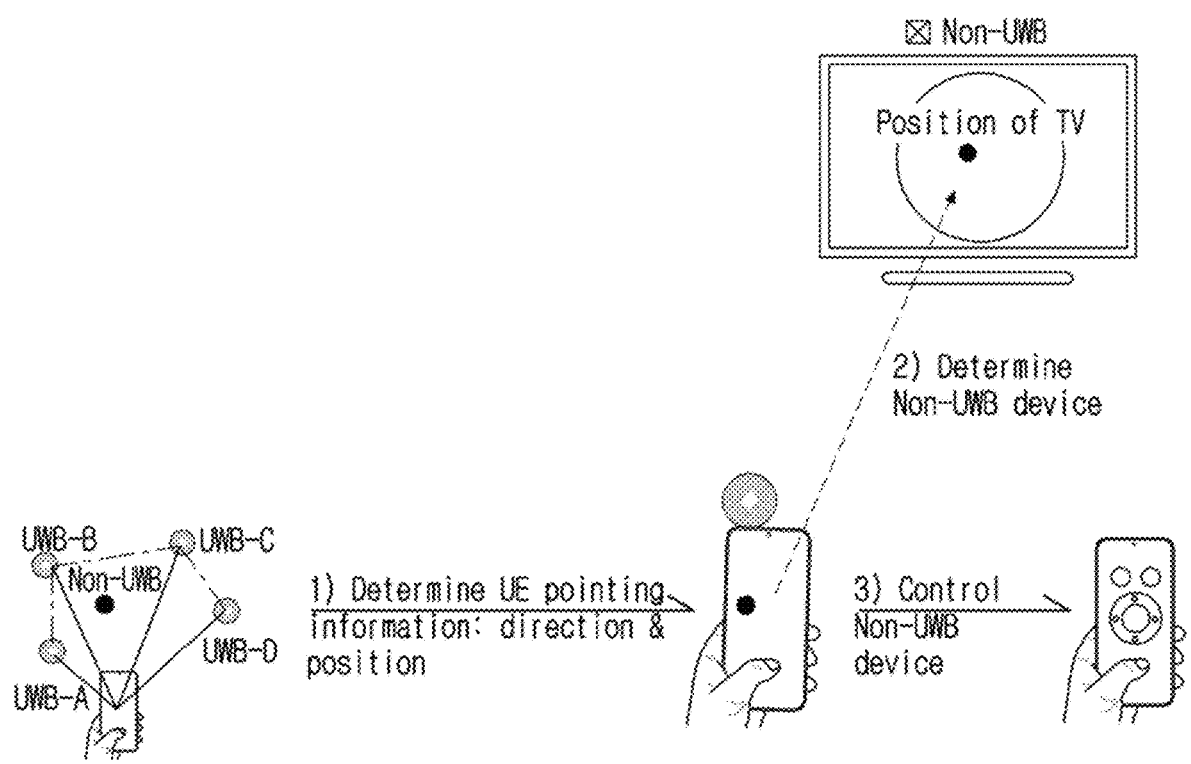
FIG. 25 is a schematic diagram of an application scenario of a method for determining a device pointed to by UE according to an example embodiment of the disclosure.
Figure 26:
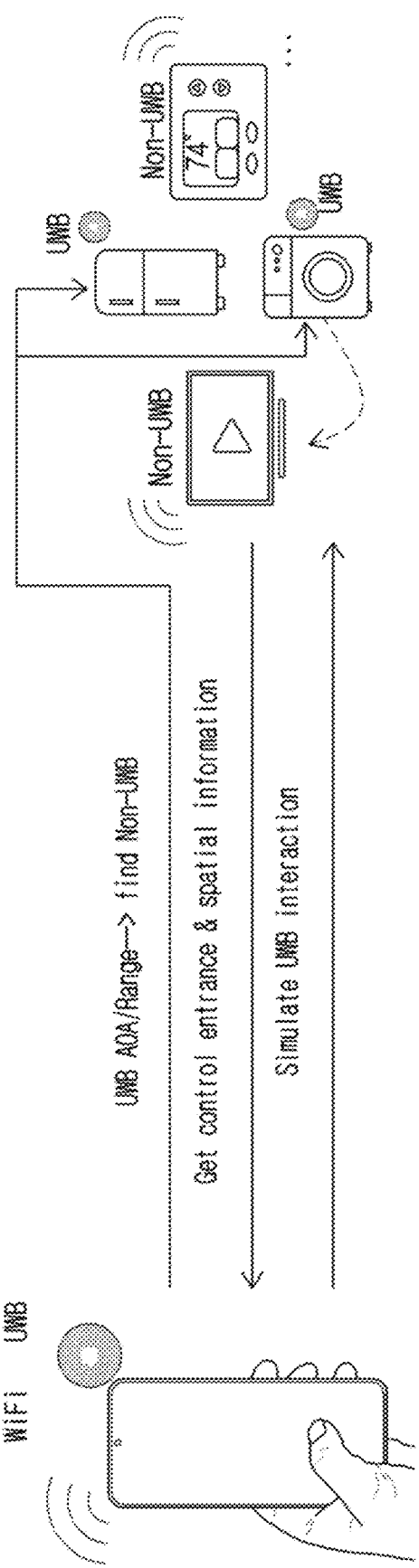
FIG. 26 is a schematic diagram of an application scenario of a method for determining a device pointed to by UE according to an example embodiment of the disclosure.

Specifically, as shown in FIG. 25 and FIG. 26, according to an example embodiment of the disclosure, after determining the target non-UWB device pointed to by the UE, the control entrance of the target non-UWB device may be obtained, to interact with the target non-UWB device.

For example, in operation S104, the target non-UWB device may be controlled based on a control entrance connected through a Bluetooth and WI-FI.

Figure 27:
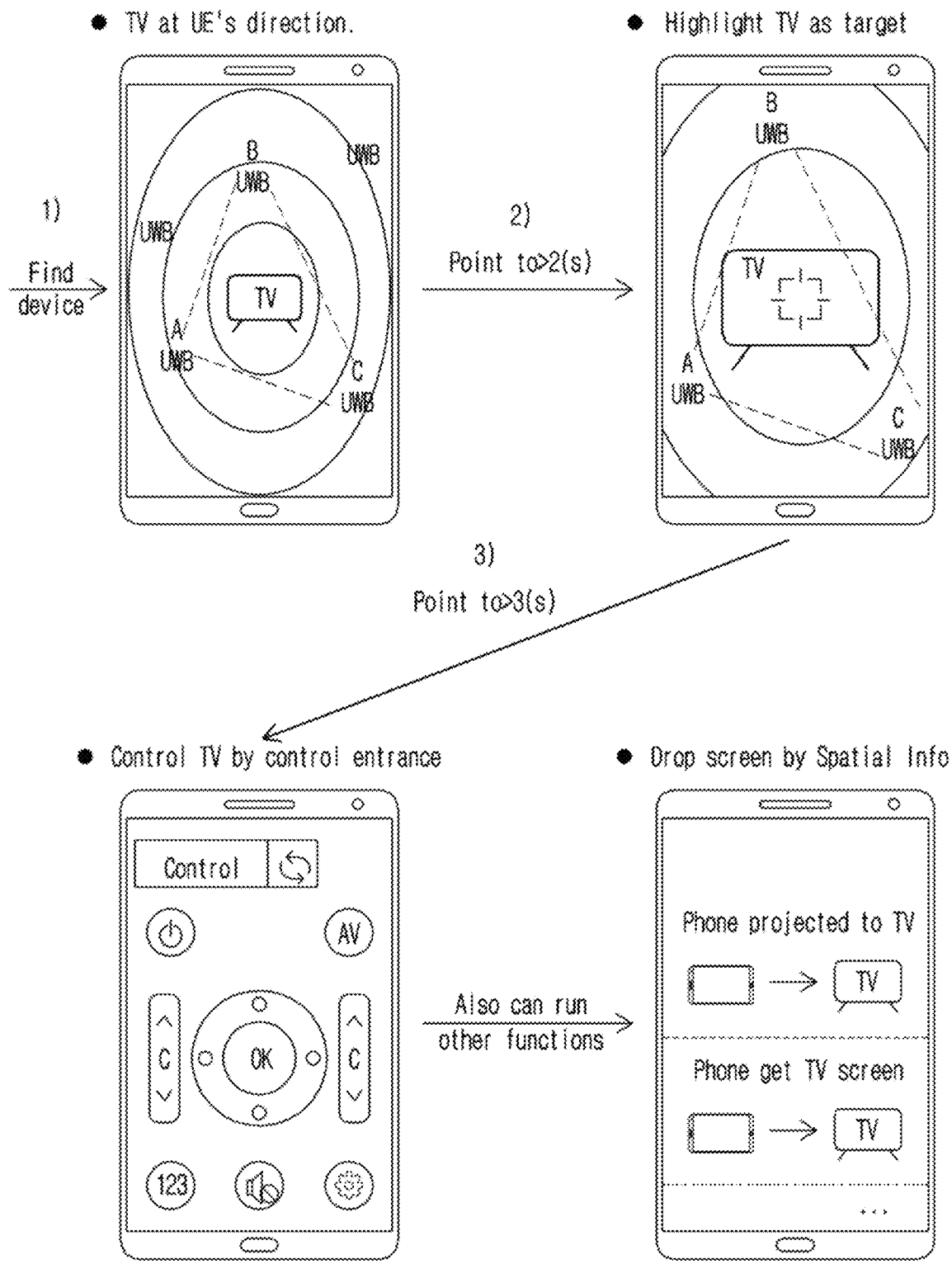
FIG. 27 is a schematic diagram of an application scenario of a method for determining a device pointed to by UE according to an example embodiment of the disclosure.

According to an example embodiment, an application of operations S101-S104 is illustrated with reference to FIG. 27:

For example, in the case that the UE points to the target non-UWB device (TV), when the UE points to the TV for more than 2 seconds, the TV is automatically highlighted as the candidate pointed device. When the UE points to the TV for more than 3 seconds, it will automatically connect to the TV for interactive operations, such as projecting the contents currently displayed on the mobile phone onto the TV.

Figure 28:
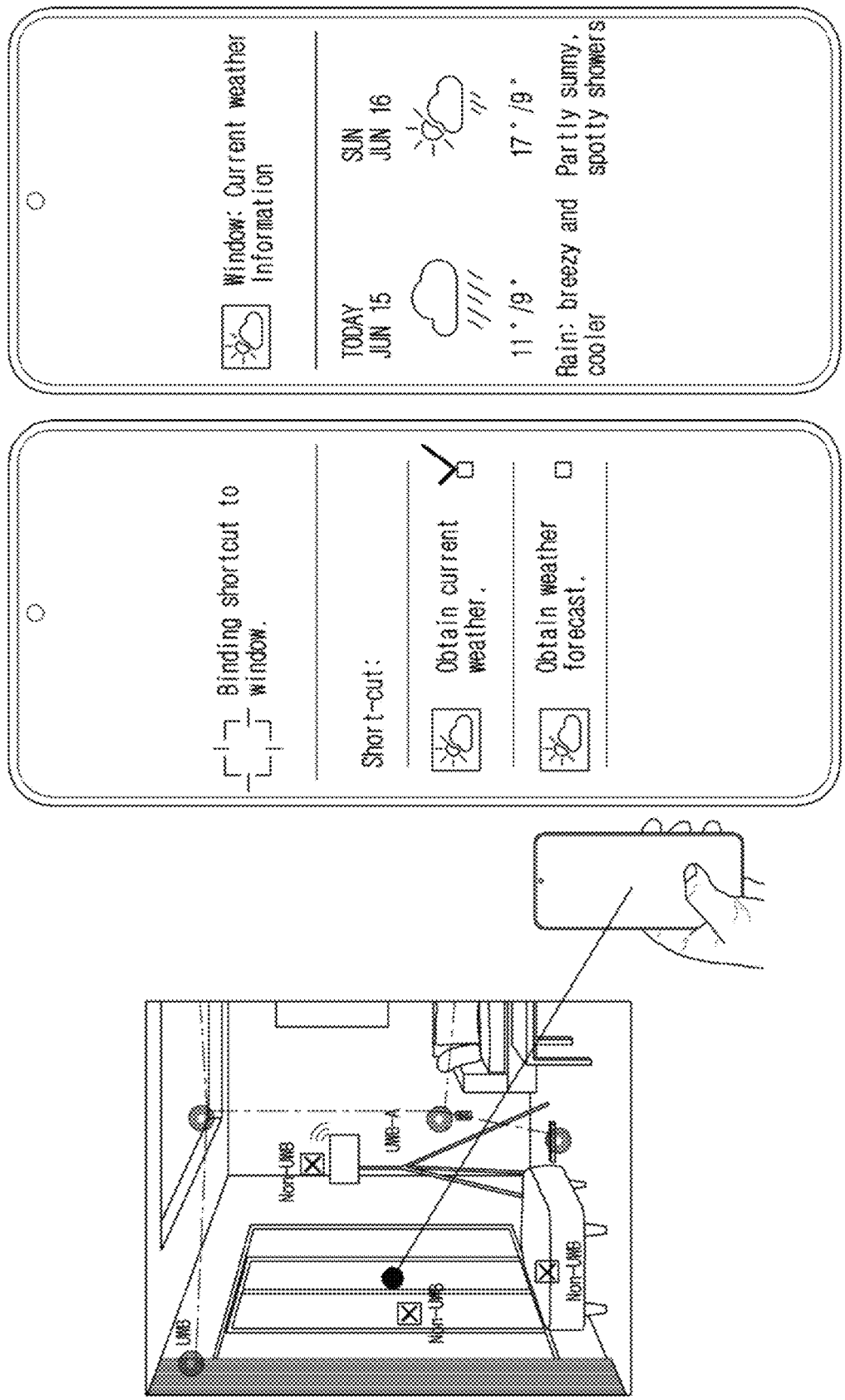
FIG. 28 is a schematic diagram of an application scenario of a method for determining a device pointed to by UE according to an example embodiment of the disclosure.

According to another example embodiment, an application of operations S101-S104 is illustrated with reference to FIG. 28:

For example, when the target non-UWB device is a normal object (window), after associating the window with the IoT application, and when the UE points to the window, the UWB operation is performed. When the user holds the UE and points to the window for the first time, a shortcut binding page may be displayed on the user interface to guide the user to bind a shortcut of a certain application APP to the window. As shown in FIG. 28, the application run on the UE may be a weather forecast APP, where the user interface displays options of binding the shortcut for obtaining current weather information and the shortcut for obtaining the weather forecast. If the user selects a shortcut for obtaining current weather information by marking the option, when the user holds the UE and points to the window for the second time, the UE will automatically launch the weather forecast APP and the current weather information will be displayed on the user interface.

According to an example embodiment, the method for determining a device pointed to by the UE further includes operations S001-S002:

According to an example embodiment, operation S001 includes determining candidate UWB devices pointed to by the UE based on the UE pointing information.

According to an example embodiment, operation S002 includes, when determining that the number of the candidate UWB devices is 0, performing the operation of determining a target non-UWB device pointed to by the UE based on the UE pointing information and spatial information of at least one non-UWB device.

Figure 29:
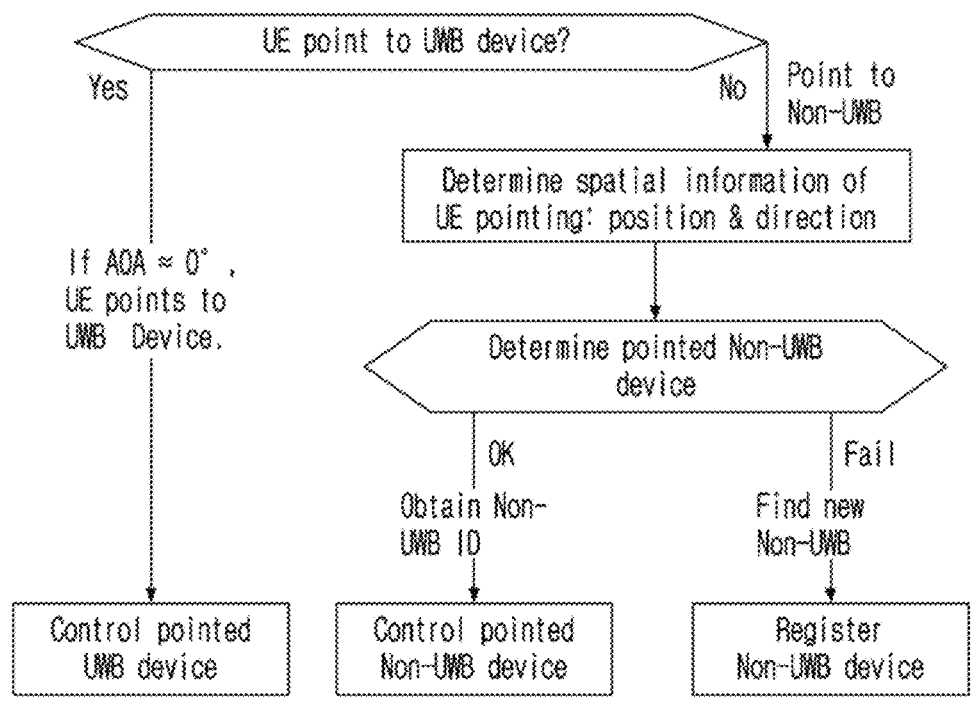
FIG. 29 is a schematic flowchart of a method for determining a device pointed to by UE according to an example embodiment of the disclosure.

Specifically, as illustrated in FIG. 29, through UWB technology, the candidate UWB devices pointed to by the current UE may be obtained based on the determined UE pointing information. When it is determined that the number of candidate UWB devices pointed to by the UE is 0, it means that the UE currently points to a non-UWB device. Accordingly, the subsequent operation of determining a target non-UWB device pointed to by the UE may be performed.

As shown in FIG. 29, when determining the candidate UWB devices to which the UE points, a UWB device within a preset pointing range may be determined as a candidate UWB device. Taking AOA as an example, for example, UWB devices whose AOA is within the range of 0-3 degrees measured by UWB may be determined as candidate UWB devices.

According to an example embodiment, based on operation S001, when the number of the candidate UWB devices is 1, the candidate UWB device is determined as the target UWB device pointed to by the UE;

According to an example embodiment, based on operation S001, the method further considers ambiguity among the current candidate UWB devices pointed to by the UE when the number of the candidate UWB devices is greater than 1. Therefore, the disclosure further provides operations D1-D3, to solve the ambiguity among the current candidate UWB devices. According to an example embodiment, the method further may perform at least one of the following operations D1-D3.

According to an example embodiment, operation D1 includes, when relative directions of at least two of the candidate UWB devices to the UE are different, determining the target UWB device pointed to by the UE based on a predefined mapping relationship between the UE pointing and overlapping region.

Figure 30:
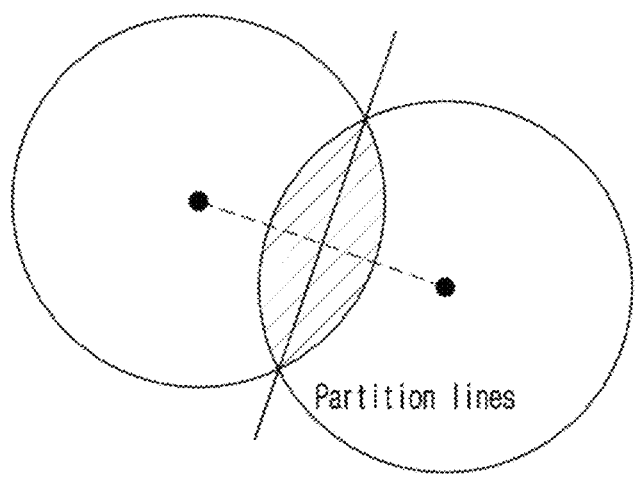
FIG. 30 is a schematic diagram of solving an ambiguity of a UWB device according to an example embodiment of the disclosure.
Figure 31:
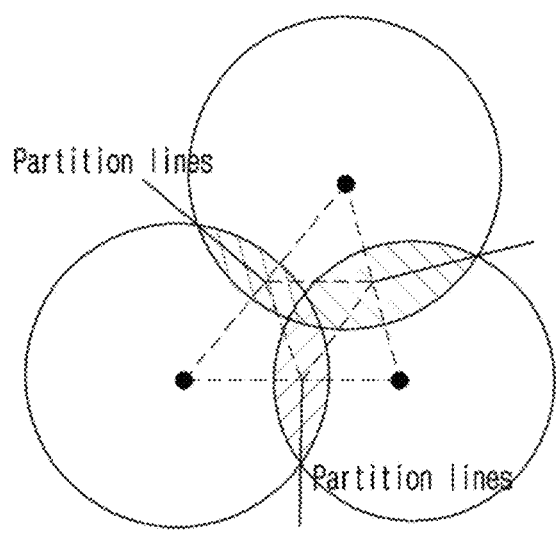
FIG. 31 is a schematic diagram of solving the ambiguity of a UWB device according to an example embodiment of the disclosure.

Specifically, as shown in FIG. 30 and FIG. 31, when the UE detects the signal of the UWB device, there is an overlapping region between the picking-regions corresponding to candidate UWB devices on the left and right or upper and lower directions (such as the AOA corresponds to the candidate UWB A pointed to by the UE is equal to 1 degree, the AOA corresponds to the candidate UWB B pointed to by the UE is equal to 2 degree, the AOA corresponds to the candidate UWB B pointed to by the UE is equal to 0 degree), a partition line may be made based on the connection of the picking points (centers) of each two of candidate UWB devices, and the overlapping region is divided based on the partition line; that is, the overlapping region is divided by establishing a partition line on the connecting line between the centers of the two overlapping regions. For the divided overlapping region, the target UWB device to which the UE points may be determined based on the preset mapping relationship between the UE pointing and the overlapping region. As shown in FIG. 30, it can be preset that when the UE points to the overlapping region on the left side, it is determined that the UE points to the UWB device corresponding to the left picking-region.

According to an example embodiment, operation D2, includes when at least two of the candidate UWB devices are in a direction pointed to by the UE, displaying movement guidance information corresponding to when pointing to each of the candidate UWB devices on the user interface, and acquiring current movement information of the UE to determine the target UWB device pointed to by the UE.

Figure 32:
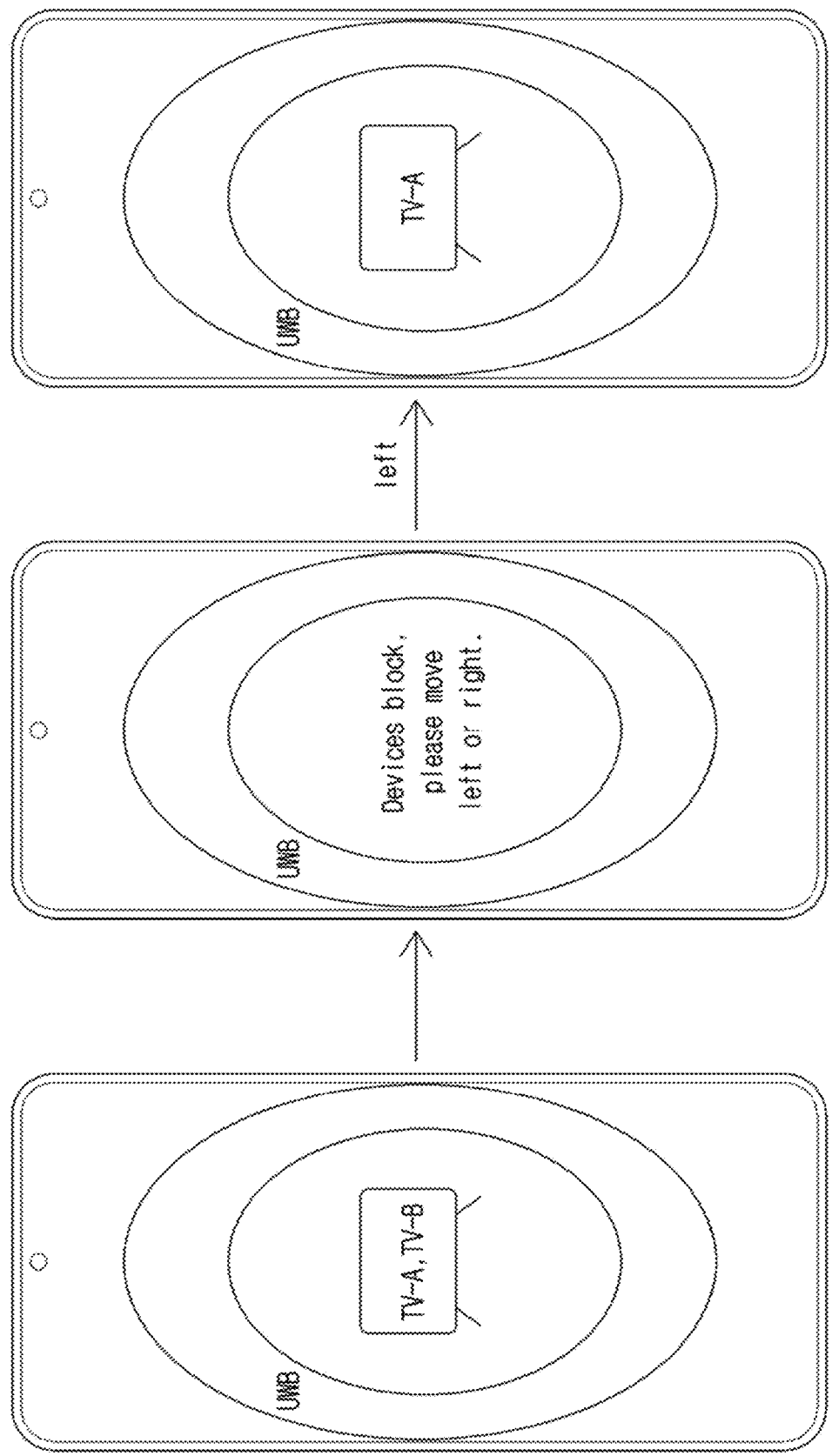
FIG. 32 is a schematic flowchart of UI interface switching provided in an example embodiment of the disclosure.
Figure 33:
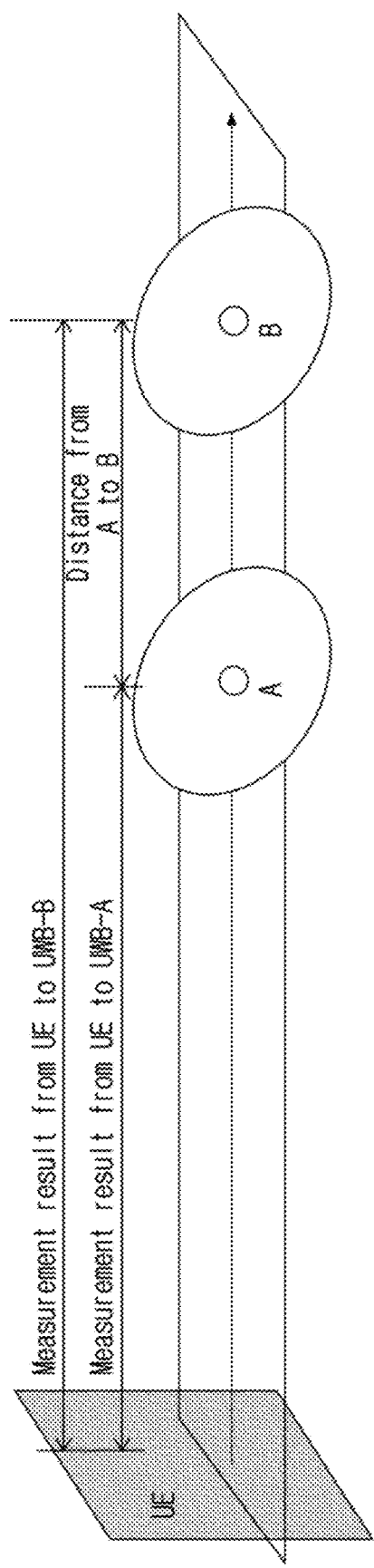
FIG. 33 is a schematic diagram of accurately measuring distance according to an example embodiment of the disclosure.

Specifically, as shown in FIG. 32, similar to the scene shown in FIG. 19, when there is overlapping between the picking-regions corresponding to at least two UWB devices (for example, the AOA corresponding to the candidate UWB devices A, B, and C pointed to by the UE is equal to 1 degree, or the AOA corresponding to the candidate UWB devices D and E pointed to by the UE is equal to 0 degree), the user interface may display information prompting the direction in which user moves the UE (movement guidance information). When the user moves the UE according to the prompt information, the target UWB device to which the UE UE is the sum of the first distance information of the UE to the previous candidate UWB and the second distance information of the previous candidate UWB device and the latter candidate UWB device. For example: as shown in FIG. 33, when there is overlapping between the picking-regions corresponding to at least two UWB devices, the distance from the UE to the UWB-B device may be determined by summing the distance from the UE to the UWB-A device and distance from the UWB-A device to UWB-B device.

Figure 34:
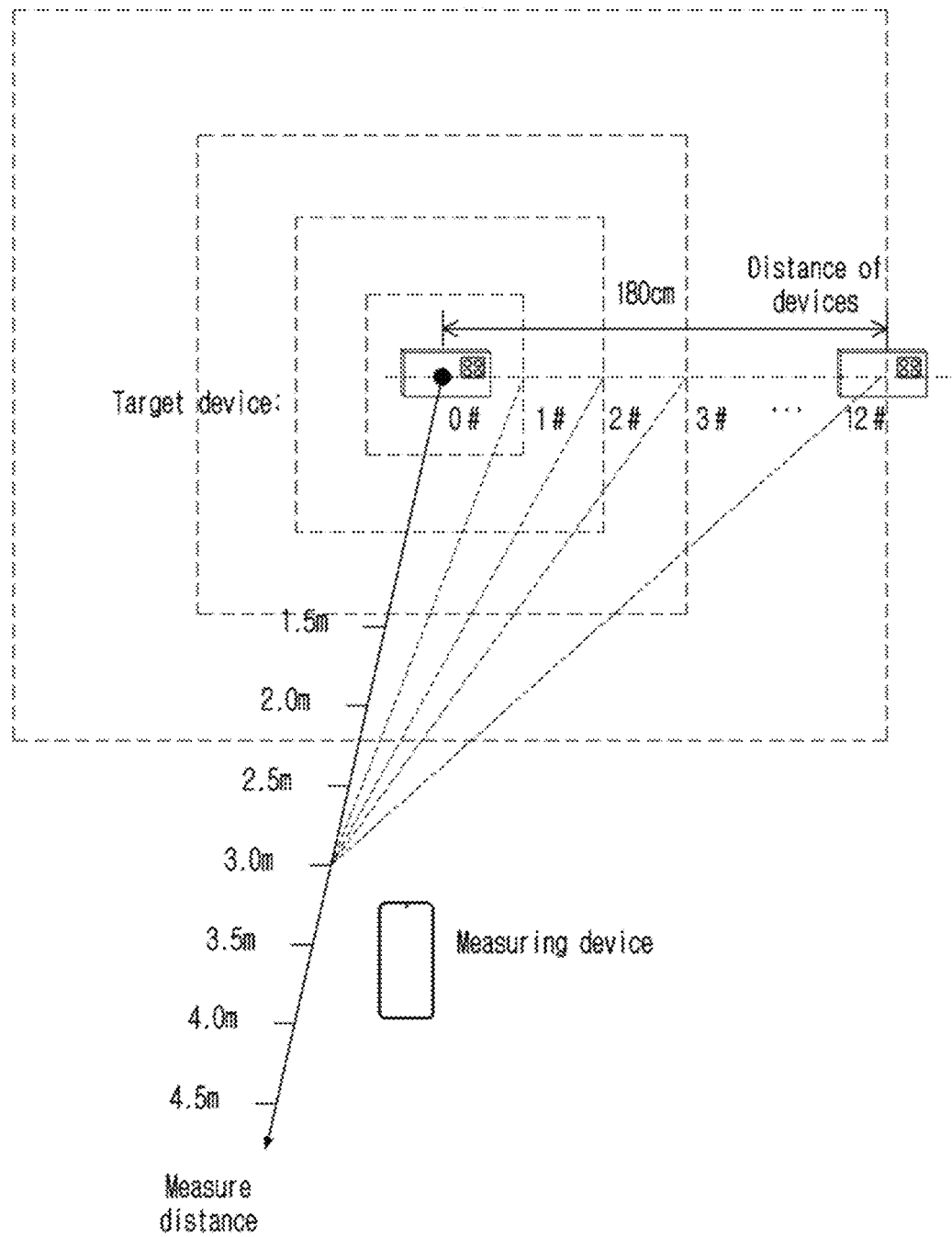
FIG. 34 is a schematic diagram of test data of a UWB device provided in an example embodiment of the disclosure.

The following describes the effects that the disclosure may achieve in solving ambiguity in combination with experimental data related to the disclosure:

It can be seen from the table 2 below with reference to FIG. 34.

TABLE 2

| distance | 0 #<br>0 cm | 1 #<br>15 cm | 2 #<br>30 cm | 3 #<br>45 cm | 4 #<br>60 cm | 5 #<br>75 cm | 6 #<br>90 cm | 7 #<br>105 cm | 8 #<br>120 cm | 9 #<br>135 cm | 10 #<br>150 cm | 11 #<br>165 cm | 12 #<br>180 cm |
|---|---|---|---|---|---|---|---|---|---|---|---|---|---|
| 1.5 m | 0°/162 | 3°/163 | 6°/165 | 8°/168 | 12°/175 | 17°/176 | 22°/175 | 24°/177 | 25°/189 | 26°/209 | 29°/217 | | |
| 2.0 m | 0°/201 | 3°/203 | 3°/205 | 4°/211 | 7°/215 | 11°/218 | 13°/220 | 16°/222 | 18°/225 | 19°/236 | 21°/250 | 23°/257 | 24°/262 |
| 2.5 m | 0°/251 | 2°/256 | 2°/258 | 3°/258 | 5°/260 | 8°/266 | 11°/268 | 14°/271 | 16°/270 | 18°/273 | 20°/281 | 22°/297 | 23°/302 |
| 3.0 m | 0°/299 | 2°/302 | 2°/308 | 3°/309 | 5°/309 | 6°/310 | 9°/312 | 11°/320 | 13°/323 | 16°/325 | 18°/325 | 20°/329 | 22°/335 |
| 3.5 m | 0°/353 | 1°/355 | 2°/360 | 3°/360 | 4°/362 | 5°/365 | 7°/366 | 8°/370 | 9°/375 | 11°/378 | 12°/381 | 15°/380 | 17°/382 |
| 4.0 m | 0°/401 | 1°/403 | 2°/405 | 3°/405 | 4°/405 | 4°/407 | 5°/409 | 7°/410 | 9°/416 | 10°/419 | 12°/423 | 13°/428 | 15°/430 |
| 4.5 m | 0°/451 | 2°/456 | 2°/456 | 3°/458 | 3°/461 | 4°/465 | 5°/459 | 6°/465 | 8°/468 | 9°/470 | 11°/480 | 12°/488 | 14°/493 | currently points may be determined according to the movement direction of the UE. Optionally, the display of the movement guidance information may include: displaying the movement guidance information on the user interface, such as displaying the corresponding moving direction when pointing to the device A and the corresponding moving direction when pointing to the device B, or displaying the device A on the left side of the interface, the device B on the right side of the interface. In addition, the movement guidance information may also be text information, as shown in FIG. 32, the text content of "The device is blocked, please move left or right a little bit" displayed on the user interface.

According to an example embodiment, operation D3 includes, when at least two of the candidate UWB devices are in a direction pointed to by the UE, displaying distance information between the UE to and each of the candidate UWB devices on the user interface.

Specifically, as shown in FIG. 32, similar to the scene shown in FIG. 19, when there is overlapping between the picking-regions corresponding to at least two UWB devices (for example, the AOA corresponding to the candidate UWB devices A, B, and C pointed to by the UE is equal to 1 degree, or the AOA corresponding to the candidate UWB devices D and E pointed to by the UE is equal to 0 degree), considering that when there are multiple candidate UWB devices, the user can determine which UWB device belongs to the device it needs to control based on the distance from each of candidate UWB devices displayed on the current user interface. As shown in FIG. 33, although the UWB device A and the UWB device B are in the same direction that the UE points, they are at different distances from the UE.

According to an example embodiment, in addition to displaying the information shown in FIG. 32, the user interface of the UE may also display the distance from the UE to each of candidate UWB devices on the user interface. On this basis, the embodiment of the disclosure also provides a method for accurately measuring the distance. Specifically, sorting from the UE to the right, the distance information between a latter candidate UWB device and the According to the test results shown in Table 2 above, when the distance between the devices is 0.15 m, AOA is equal to 3°~1°; when the distance is 0.30 m, AOA is equal to 6°~2°; when the distance is 0.45 m, AOA is equal to 8°~3°; when the distance is 0.60 m, AOA is equal to 12°~3°, etc. It can be understood that:

1. According to UWB test results, if the distance between multiple devices is greater than 0.45 m and the measured distance is greater than 1.5 m, the UWB AOA angle will be greater than or equal to 3°. Therefore, the UE may easily distinguish adjacent IoT devices through UWB measurement.
2. If the distance between multiple devices is less than 0.45 m, there is ambiguity when distinguishing IoT devices. Therefore, it is necessary to adjust the picking-regions of adjacent devices to overcome the ambiguity. According to UWB test results, if the distance between multiple devices is less than 0.45 m, and the measurement distance is greater than 1.5 m, the UWB AOA measurement angle will be less than 3°. Therefore, it is not easy for the UE to distinguish adjacent IoT devices through UWB measurement.

Therefore, based on the above experimental data, it can be determined that if the distance between the devices is less than 0.45 m and AOA is less than 3°, the ambiguity are prone to exist, and the solutions to the ambiguity provided in the above embodiments of the disclosure may be adapted to the corresponding cases. The above experimental data are exemplary results. When different test equipment is used or the test environment is different, the test results may be different, which is not limited in the disclosure.

According to an example embodiment, when it is determined that the number of candidate UWB devices pointed to by the UE is equal to 1, that is, the AOA is approximately equal to 0 degree, it may be determined that the UE pointes to the UWB device and the UE may interact with the UWB device.

Figure 35:
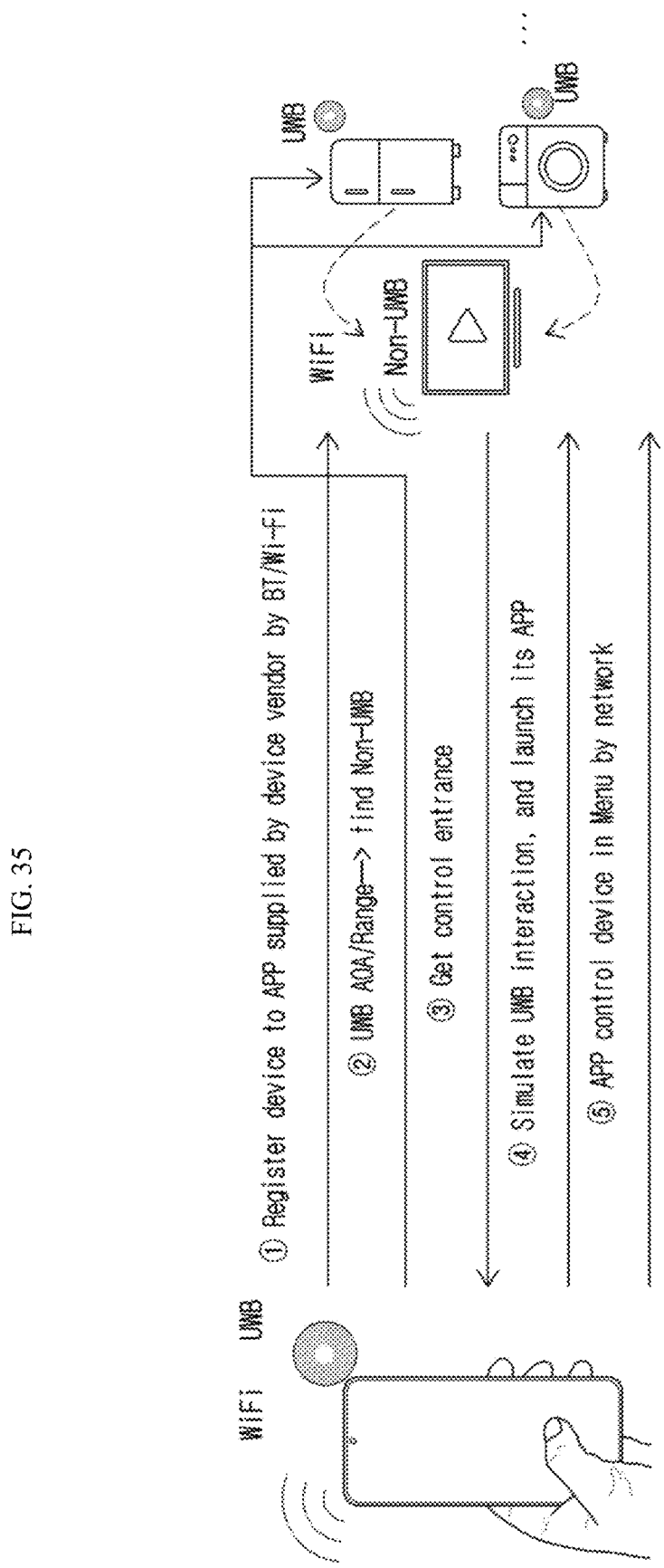
FIG. 35 is a schematic diagram of an application scenario of a method for determining a device pointed to by UE according to an example embodiment of the disclosure.
Figure 36:
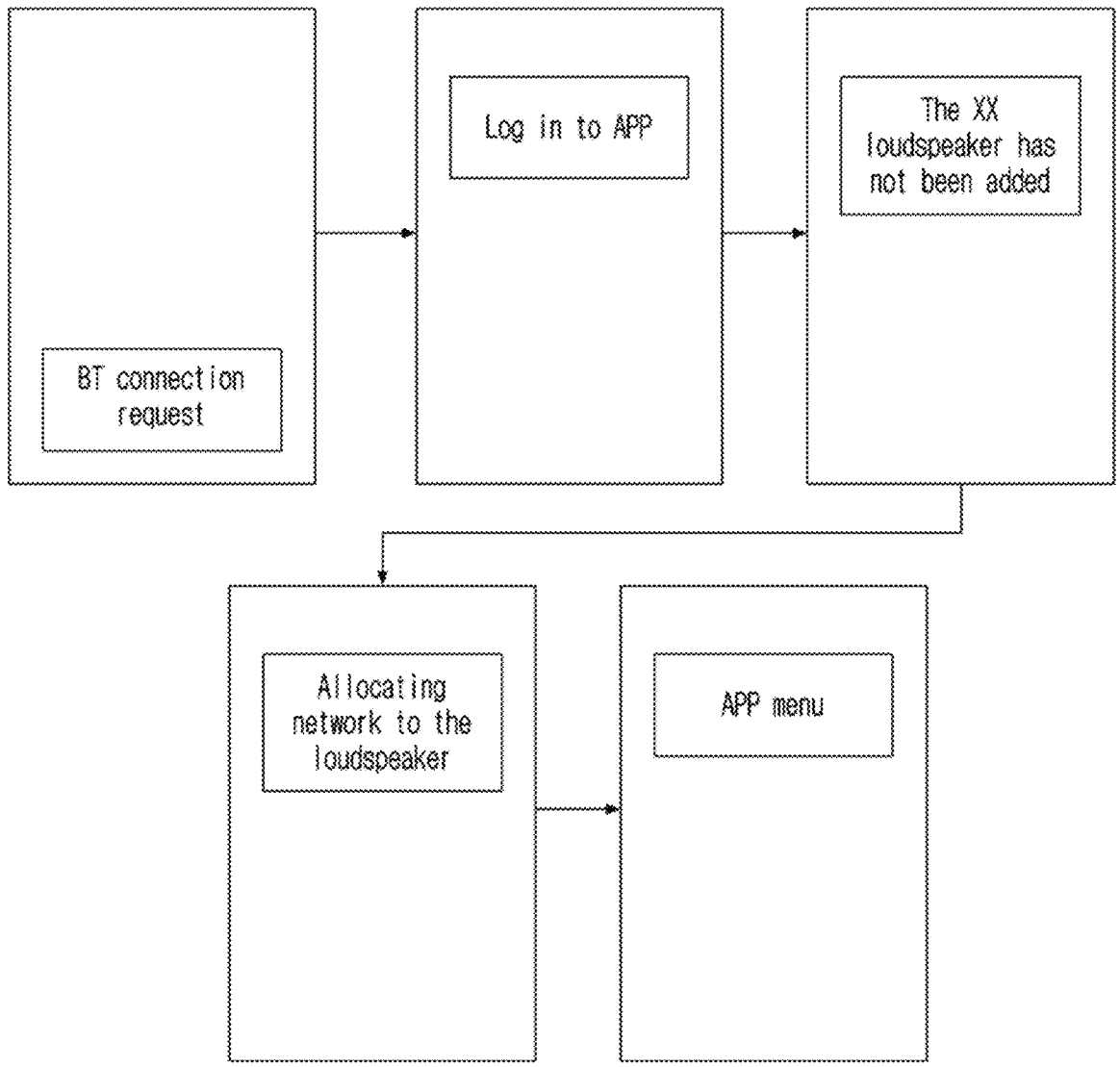
FIG. 36 is a schematic diagram of application interface switching for a method for determining a device pointed to by UE according to an example embodiment of the disclosure.

FIG. 35 and FIG. 36 illustrate an application of the foregoing method of determining a device pointed to by the UE according to an example embodiment.

According to an example embodiment, a device is registered to an application (APP) provided by a vendor through BT/WI-FI. Specifically, the UE first connects to the device through BT, and after the user logs in to the APP, the device is added to the APP, and then the device is connected to WI-FI. The user may control the device through the network. Thereafter, through UWB AOA/Range and the method for determining UE pointing information provided in the embodiment, the pointed target non-UWB device is searched. Then, the UE obtains the control entrance and spatial information through the spatial device relationship table, the UE starts the APP provided by the IoT vendor and then the user controls the IoT device through the APP Menu based on the network (App-Cloud-Device data transmission process). For example, the user controls the interface of the IoT device to switch through the APP Menu.

Figure 37:
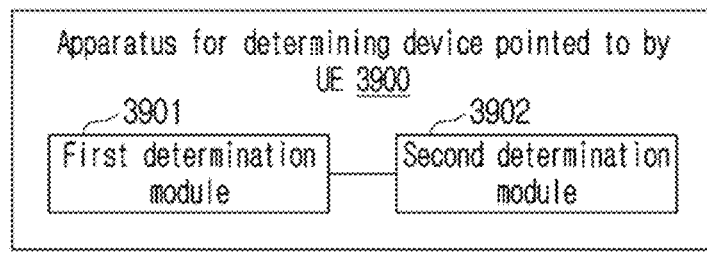
FIG. 37 is a schematic structural diagram of an apparatus for determining a device pointed to by UE according to an example embodiment of the disclosure.

FIG. 37 illustrates an apparatus for determining a device pointed to by a UE according to an example embodiment. As shown in FIG. 37, an apparatus 3900 for determining a device pointed to by a UE includes a first determiner 3901 and a second determiner 3902.

According to an example embodiment, the first determiner 3901 is configured to determine UE pointing information based on spatial information of UWB devices.

According to an example embodiment, the second determiner 3902 is configured to determine a target non-UWB device pointed to by the UE based on the UE pointing information and spatial information of at least one non-UWB device.

According to an example embodiment, when determining UE pointing information based on spatial information of UWB devices, the first determiner 3901 is configured to: determine position information of the UE based on relative position information of the UE and the UWB devices and determine the UE pointing information based on the position information of the UE.

According to an example embodiment, when determining position information of the UE based on relative position information of the UE and the UWB devices, the first determiner 3901 is configured to: determine position information of each of UWB devices in a set space coordinate system, determine relative position information of the UE and each of UWB device, and determine the position information of the UE in the set space coordinate system, based on the position information of each of UWB devices in the set space coordinate system and the relative position information of the UE and each of UWB devices.

According to an example embodiment, the relative position information includes relative distance information and relative direction information.

According to an example embodiment, the set space coordinate system is a three-dimensional coordinate system constructed with any set position as the origin; the any set position includes the position where any of the UWB devices is located.

According to an example embodiment, when determining the UE pointing information based on the position information of the UE, the first determiner 3901 is configured to: determine measurement position information of the UE and each of the UWB devices in a UE measure coordinate system respectively; the UE measure coordinate system has a origin of the position of the UE, a X axis parallel to a width direction of the UE, and a Y axis parallel to a length direction of the UE, and a Z axis perpendicular to a setting plane of the UE, determine reference position information of the UE and each of the UWB devices in a UE reference coordinate system respectively; the UE reference coordinate system has an origin of the position of the UE, and coordinate axes parallel to corresponding coordinate axes of the set space coordinate system; and determine the UE pointing information based on the measurement position information and the reference position information of the UE and each of the UWB devices.

According to an example embodiment, when determining a target non-UWB device pointed to by the UE based on the UE pointing information and spatial information of at least one non-UWB device, the second determiner 3902 is configured to: determine a candidate non-UWB device(s) pointed to by the UE, based on the UE pointing information and the spatial information of at least one non-UWB device, and determining the target non-UWB device pointed to by the UE among the candidate non-UWB device(s).

According to an example embodiment, when determining candidate non-UWB devices pointed to by the UE based on the UE pointing information and spatial information of at least one non-UWB device, the second determiner 3902 is configured to: acquire spatial information of at least one non-UWB device, wherein the spatial information of at least one non-UWB device includes position information and/or picking-region information of the at least one non-UWB device; and if the UE pointing information intersects a picking-region of any of at least one non-UWB device, or a deviation between the UE pointing information and a direction of the UE position to a position of any of at least one non-UWB device is within a preset deviation range, determine the non-UWB device as a candidate non-UWB device pointed to by the UE.

According to an example embodiment, when determining the target non-UWB device pointed to by the UE among the candidate non-UWB device(s), the second determiner 3902 is configured to: (i) when the number of candidate non-UWB device(s) is 1, determine the candidate non-UWB device as the target non-UWB device pointed to by the UE, (ii) when the number of candidate non-UWB device(s) is 0, identify an unregistered non-UWB device, and acquire spatial information of the unregistered non-UWB device, and re-perform the operation of determining a target non-UWB device pointed to by the UE based on the UE pointing information and spatial information of at least one non-UWB device, (iii) when the number of candidate non-UWB device(s) is 0, identify a non-UWB device that has moved, display movement guidance information corresponding to when pointing to the non-UWB device that has moved on a user interface, and in response to an operation event of the UE pointing information moving to an original position of the non-UWB device, determine the non-UWB device that has moved as the target non-UWB device pointed to by the UE, (iv) when the number of candidate non-UWB device(s) is greater than 1, adjust the picking-region corresponding to each of candidate non-UWB devices based on overlapping of picking-regions corresponding to candidate non-UWB devices, and determine the target non-UWB device pointed to by the UE based on the adjusted picking-region; and (v) when the number of candidate non-UWB device(s) is greater than 1, display movement guidance information corresponding to when pointing to each of the candidate non-UWB devices on the user interface based on the overlapping of picking-regions corresponding to the candidate non-UWB devices, and determine the target non-UWB device pointed to by the UE based on a current movement information of the UE.

According to an example embodiment, when identifying an unregistered non-UWB device, the second determiner

3902 is configured to: identify the unregistered non-UWB device based on captured image information.

According to an example embodiment, when acquiring spatial information of the unregistered non-UWB device, the second determiner 3902 is configured to perform any one of: in response to an operation event of placing the UE at the position of the unregistered non-UWB device, acquiring spatial information of the UE as the spatial information of the unregistered non-UWB device; and acquiring distance information between the UE and the unregistered non-UWB device, and determining the spatial information of the unregistered non-UWB device based on the distance information and the UE pointing information.

According to an example embodiment, the apparatus 3900 may further including: a controller, configured to acquire a control entrance of the target non-UWB device; and control the target non-UWB device based on the control entrance.

According to an example embodiment, when controlling the target non-UWB device based on the control entrance, the controller is configured to: control the target non-UWB device based on a control entrance connected through a Bluetooth and Wi-Fi.

According to an example embodiment, after determining the UE pointing information based on the spatial information of the UWB devices, the first determiner 3901 is configured to: determine candidate UWB device(s) pointed to by the UE based on the UE pointing information; and when determining that the number of the candidate UWB device(s) is 0, perform the operation of determining a target non-UWB device pointed to by the UE based on the UE pointing information and spatial information of at least one non-UWB device.

According to an example embodiment, the first determiner 3901 is further configured to: when the number of the candidate UWB device(s) is 1, determine the candidate UWB device is the target UWB device pointed to by the UE, when the number of the candidate UWB device(s) is greater than 1, perform at least one of the following: (i) when relative directions of at least two of the candidate UWB devices to the UE are different, determine the target UWB device pointed to by the UE based on a predefined mapping relationship between the UE pointing and overlapping region; (ii) when at least two of the candidate UWB devices are in a direction pointed to by the UE, display movement guidance information corresponding to when pointing to each of the candidate UWB devices on the user interface, and acquire current movement information of the UE to determine the target UWB device pointed to by the UE; and (iii) when the at least two of candidate UWB devices are in a direction pointed to by the UE, display distance information between the UE and each of the candidate UWB devices on the user interface.

The apparatus for determining a device pointed to by a UE according to an embodiment of the disclosure may perform a method for determining a device pointed to by a UE provided in an embodiment of the disclosure, and its implementation principle is similar. The actions performed by the determiners in the apparatus for determining a device pointed to by a UE in embodiments of the disclosure may correspond to operations in the method for determining a device pointed to by a UE in embodiments of the disclosure. For detailed functional descriptions of the determiners of in the apparatus for determining a device pointed to by a UE, refer to the previous description of the method for determining a device pointed to by a UE, and may not be repeated here.

The apparatus for determining a device pointed to by a UE provided in the embodiment of the disclosure is introduced above from the perspective of functional modularization. Next, the electronic device provided in the embodiment of the disclosure will be introduced from the perspective of hardware materialization, and at the same time, the computing system of the electronic device will be introduced.

Based on the same principle as the method shown in the embodiments of the disclosure, an electronic device is also provided in the embodiments of the disclosure. The electronic device may include, but is not limited to: a processor and a memory; memory is configured to store computer operation instructions; the processor is configured to execute the method for determining a device pointed to by a UE shown in the embodiment by invoking the computer operation instructions. Compared with the related art technology, the disclosure determines a target non-UWB device pointed to by the UE in the UWB environment based on spatial perception capability of UWB, to improve the user's experience of UWB pointing operation.

Figure 38:
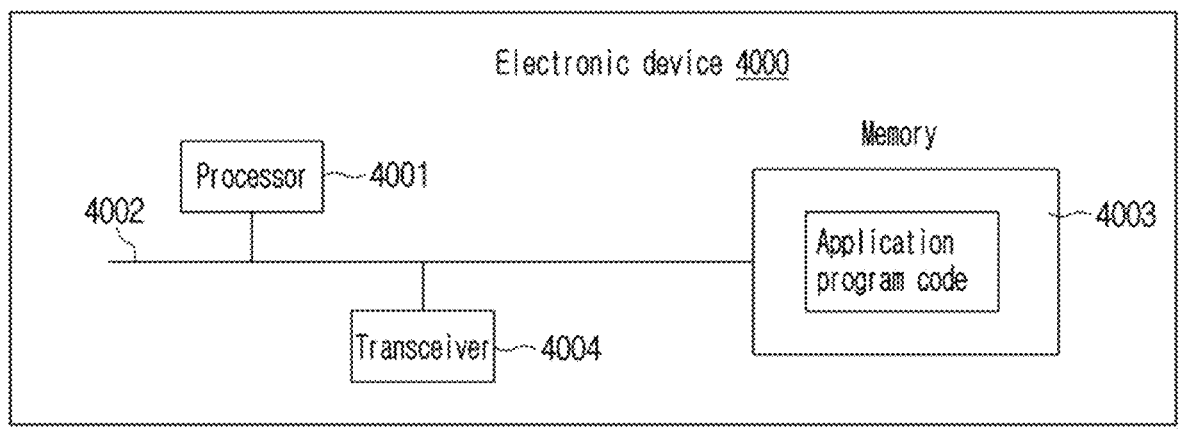
FIG. 38 is a schematic structural diagram of an electronic device provided in an example embodiment of the disclosure.

According to an example embodiment, an electronic device is provided. As shown in FIG. 38, the electronic device 4000 includes a processor 4001 and a memory 4003. The processor 4001 and the memory 4003 may be connected, for example, through a bus 4002. The electronic device 4000 may further include a transceiver 4004. It should be noted that in actual applications, the transceiver 4004 is not limited to one, and the structure of the electronic device 4000 does not constitute a limitation to the embodiment of the disclosure.

The processor 4001 may be a Central Processing Unit (CPU), a general-purpose processor, a Digital Signal Processor (DSP), an Application Specific Integrated Circuit (ASIC), and a Field Programmable Gate Array (FPGA) or other programmable logic devices, transistor logic devices, hardware components or any combination thereof. It may implement or execute various exemplary logical blocks, modules, and circuits described in conjunction with the disclosure of the disclosure. The processor 4001 may also be a combination for realizing computing functions, for example, including a combination of one or more microprocessors, a combination of a DSP and a microprocessor, and so on.

The bus 4002 may include a path for transferring information between the above-mentioned components. The bus 4002 may be a Peripheral Component Interconnect (PCI) bus or an Extended Industry Standard Architecture (EISA) bus or the like. The bus 4002 may be divided into an address bus, a data bus, a control bus, and so on. For ease of representation, only one thick line is used to indicate in FIG. 38, but it does not mean that there is only one bus or one type of bus.

The memory 4003 may be Read Only Memory (ROM) or other types of static storage devices that can store static information and instructions, Random Access Memory (RAM), or other types of dynamic storage devices capable of storing information and instructions, may also be Electrically Erasable Programmable Read Only Memory (EEPROM), Compact Disc Read Only Memory (CD-ROM) or other optical disk storage, optical disc storage (including compact discs, laser discs, optical discs, digital versatile discs, Blu-ray discs, etc.), magnetic disk storage media or other magnetic storage devices, or any other media capable to carry or store desired program codes in the form of instructions or data structures and to access by a computer, but not limited to this.

The memory 4003 is used to store application program codes for executing the solutions of the disclosure, and is controlled by the processor 4001 to execute. The processor 4001 is configured to execute the application program codes stored in the memory 4003 to implement the content shown in the foregoing method embodiment.

The electronic devices may include, but are not limited to, mobile terminals such as mobile phones, notebook computers, digital broadcast receivers, personal digital assistants (PDAs), tablet computers (PADs), portable multimedia players (PMPs), and vehicle terminals (such as vehicle navigation terminals), and fixed terminals such as digital TVs, desktop computers, etc.

The electronic device shown in FIG. 38 is only an example, and should not bring any limitation to the function and scope of use of the example embodiments of the disclosure.

According to an example embodiment of the disclosure, there is provided a computer-readable storage medium, stored thereon a computer program, and when executed on a computer, the computer can perform the corresponding content in the foregoing method embodiment.

It should be understood that although the various operations in the flowchart of the drawings are displayed in sequence as indicated by the arrows, these operations are not necessarily performed in sequence in the order indicated by the arrows. Unless explicitly stated in this article, the execution of these operations is not strictly limited in order, and they can be executed in other orders. Moreover, at least part of the operations in the flowchart of the drawings may include multiple sub-operations or multiple stages. These sub-operations or stages are not necessarily executed at the same time, but can be executed at different times, and the order of execution is not necessarily performed sequentially, but may be performed in turn or alternately with at least a part of other operations or sub-operations or stages of other operations.

It should be noted that the above-mentioned computer-readable storage medium in the disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus, or device, or a combination of any of the above. More specific examples of computer-readable storage media may include, but not limited to: electrical connections with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the disclosure, the computer-readable storage medium may be any tangible medium that contains or stores a program, which may be used by or in combination with an instruction execution system, apparatus, or device. In the disclosure, the computer-readable signal medium, therein carried a computer-readable program code, may include a data signal propagated in baseband or as a part of a carrier wave. This propagated data signal may take many forms, including but not limited to, electromagnetic signal, optical signal, or any suitable combination of the above. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium may be transmitted by any suitable medium, including but not limited to: wire, optical cable, radio frequency (RF), or any suitable combination of the above.

The above-mentioned computer-readable medium may be included in the above-mentioned electronic device; or may exist alone without being assembled into the electronic device.

The above-mentioned computer-readable medium carries one or more programs, and when the above-mentioned one or more programs are executed by the electronic device, the electronic device performs the methods in the above embodiments.

The computer program code used to perform the operations of the disclosure may be written in one or more programming language(s) or a combination thereof. The above-mentioned programming languages include object-oriented programming languages, such as Java, Smalltalk, C++, and also include conventional procedural programming languages, such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network, including a local area network (LAN) or a wide area network (WAN), or may be connected to an external computer (for example, connection via Internet by using an Internet service provider).

The flowcharts and block diagrams in the accompanying drawings illustrate the possible implementation of the system architectures, functions, and operations of the system, method, and computer program product according to various embodiments of the disclosure. In this regard, each block in the flowcharts or block diagrams may represent a module, program segment, or part of code, and the module, program segment, or part of code contains one or more executable instructions for realizing the specified logic function. It should also be noted that, in some alternative implementations, the functions marked in the block may also occur in a different order from the order marked in the drawings. For example, two blocks shown in succession may actually be executed substantially in parallel, and may sometimes be executed in the reverse order, depending on the functions involved. It should also be noted that each block in the block diagrams and/or flowcharts, and the combination of the blocks in the block diagrams and/or flowcharts, may be implemented by a dedicated hardware-based system that performs the specified functions or operations, or may be implemented by a combination of dedicated hardware and computer instructions.

The modules or units involved in the embodiments described in the disclosure may be implemented in software or hardware. The term the module or unit does not constitute a limitation to the unit itself under certain circumstances. For example, a first data acquisition module may also be described as "a module for determining UE pointing information based on spatial information of UWB devices".

The above description is only a preferred embodiment of the disclosure and an explanation of the applied technical principles. Those skilled in the art should understand that the scope of disclosure involved in the disclosure is not limited to the technical solutions formed by the specific combination of the above technical features, and should also cover the other technical solutions formed by arbitrarily combining the above technical features or equivalent features therefore without departing from the above disclosed concept. For example, a technical solution formed by the above-mentioned features being replacing with a technical feature having similar functions in the disclosure.

What is claimed:

1. A method for determining a device pointed to by a user equipment (UE), comprising:
  determining UE pointing information based on spatial information of one or more Ultra Wide Band (UWB) devices; and
  determining a target non-UWB device pointed to by the UE based on the UE pointing information and spatial information of at least one non-UWB device,
  wherein the UE pointing information comprises information indicating a pointing direction of the UE.

2. The method according to claim 1, wherein the determining the UE pointing information based on the spatial information of the one or more UWB devices comprises:
  determining position information of the UE based on relative position information between the UE and the one or more UWB devices; and
  determining the UE pointing information based on the position information of the UE.

3. The method according to claim 2, wherein the determining the position information of the UE based on the relative position information between the UE and the one or more UWB devices comprises:
  determining position information of each of the one or more UWB devices in a set space coordinate system;
  determining respective relative position information between the UE and each of the one or more UWB devices;
  determining the position information of the UE in the set space coordinate system, based on the position information of each of the one or more UWB devices in the set space coordinate system and the relative position information between the UE and each of the one or more UWB devices.

4. The method according to claim 2, wherein the relative position information comprises relative distance information and relative direction information.

5. The method according to claim 3, wherein the set space coordinate system is a three-dimensional coordinate system based on any set position as an origin, and
  wherein the set position comprises the positions where the one or more UWB devices is located.

6. The method according to claim 3, wherein the determining the UE pointing information based on the position information of the UE comprises:
  determining measurement position information of the UE and each of the one or more UWB devices in a UE measure coordinate system respectively, the UE measure coordinate system having a origin of the position of the UE, a X axis parallel to a width direction of the UE, and a Y axis parallel to a length direction of the UE, and a Z axis perpendicular to a setting plane of the UE;
  determining reference position information of the UE and each of the one or more UWB devices in a UE reference coordinate system respectively, the UE reference coordinate system having an origin of the position of the UE, and coordinate axes parallel to corresponding coordinate axes of the set space coordinate system; and
  determining the UE pointing information based on the measurement position information and the reference position information of the UE and each of the one or more UWB devices.

7. The method according to claim 2, wherein the determining the target non-UWB device pointed to by the UE based on the UE pointing information and the spatial information of the at least one non-UWB device comprises:
  determining one or more candidate non-UWB devices pointed to by the UE, based on the UE pointing information and the spatial information of the at least one non-UWB device, and
  determining the target non-UWB device pointed to by the UE from among the one or more candidate non-UWB devices.

8. The method according to claim 7, wherein the determining the one or more candidate non-UWB devices pointed to by the UE, comprises:
  acquiring spatial information of the at least one non-UWB device, the spatial information of the at least one non-UWB device comprises position information or picking-region information of the at least one non-UWB device; and
  based on a determination that the UE pointing information intersects a picking-region of any of the at least one non-UWB device, or a deviation between the UE pointing information and a direction of the position of the UE to a position of any of the at least one non-UWB device is within a preset deviation range, determining the non-UWB device as the one or more candidate non-UWB devices pointed to by the UE.

9. The method according to claim 8, wherein the determining the target non-UWB device pointed to by the UE among the one or more candidate non-UWB devices comprises:
  based on a number of the one or more candidate non-UWB devices being one, determining the candidate non-UWB device as the target non-UWB device pointed to by the UE;
  based on the number of the one or more candidate non-UWB devices being zero:
  identifying an unregistered non-UWB device, and acquiring spatial information of the unregistered non-UWB device, and re-performing the determining the target non-UWB device pointed to by the UE; or
  identifying a non-UWB device that has moved, displaying movement guidance information corresponding to when pointing to the non-UWB device that has moved on a user interface, and in response to an operation event of the UE pointing information moving to an original position of the non-UWB device, determining the non-UWB device that has moved as the target non-UWB device pointed to by the UE;
  based on the number of the one or more candidate non-UWB devices being greater than 1:
  adjusting the picking-region corresponding to each of the one or more candidate non-UWB devices based on overlapping of picking-regions corresponding to the one or more candidate non-UWB devices, and determining the target non-UWB device pointed to by the UE based on the adjusted picking-region; or
  displaying movement guidance information corresponding to when pointing to each of the one or more candidate non-UWB devices on the user interface based on the overlapping of picking-regions corresponding to the candidate non-UWB devices, and determining the target non-UWB device pointed to by the UE based on a current movement information of the UE.

10. The method according to claim 9, wherein the identifying the unregistered non-UWB device, comprises:
identifying the unregistered non-UWB device based on captured image information.

11. The method according to claim 9, wherein the acquiring spatial information of the unregistered non-UWB device comprises:
in response to an operation event of placing the UE at a position of the unregistered non-UWB device, acquiring spatial information of the UE as the spatial information of the unregistered non-UWB device; or
acquiring distance information between the UE and the unregistered non-UWB device, and determining the spatial information of the unregistered non-UWB device based on the distance information and the UE pointing information.

12. The method according to claim 1, further comprising:
acquiring a control entrance of the target non-UWB device; and
controlling the target non-UWB device based on the control entrance.

13. The method according to claim 12, wherein the controlling the target non-UWB device based on the control entrance comprises:
controlling the target non-UWB device based on the control entrance connected through a Bluetooth or Wi-Fi.

14. The method according to claim 1, further comprising:
determining one or more candidate UWB devices pointed to by the UE based on the UE pointing information; and
based on a number of the one or more candidate UWB devices being zero, performing the determining the target non-UWB device pointed to by the UE based on the UE pointing information and the spatial information of the at least one non-UWB device.

15. The method according to claim 14, further comprising:
based on the number of the one or more candidate UWB devices being one, determining that the candidate UWB device is the target UWB device pointed to by the UE;
based on the number of the one or more candidate UWB devices being greater than two, performing at least one of the following:
when relative directions of at least two of the one or more candidate UWB devices to the UE are different, determining the target UWB device pointed to by the UE based on a predefined mapping relationship between the UE pointing information and overlapping region;
when at least two of the one or more candidate UWB devices are in a direction pointed to by the UE, displaying movement guidance information corresponding to when pointing to each of the one or more candidate UWB devices on an user interface, and acquiring current movement information of the UE to determine the target UWB device pointed to by the UE; or
when the at least two of the one or more candidate UWB devices are in a direction pointed to by the UE, displaying distance information between the UE and each of the one or more candidate UWB devices on the user interface.

16. The method according to claim 1, wherein the UE pointing information is based on relative position information of the UE and the one or more UWB devices.

17. The method according to claim 16, wherein the relative position information of the UE and the one or more UWB devices comprises relative distance information between the UE and the one or more UWB devices and relative direction information between the UE and the one or more UWB devices.

18. An apparatus for determining a device pointed to by a user equipment (UE), comprising:
a memory storing one or more instructions; and
at least one processor, which based on executing the one or more instructions, is configured to:
determine UE pointing information based on spatial information of one or more Ultra Wide Band (UWB) devices; and
determine a target non-UWB device pointed to by the UE based on the UE pointing information and spatial information of at least one non-UWB device,
wherein the UE pointing information comprises information indicating a pointing direction of the UE.

19. A non-transitory computer readable medium having stored thereon a computer program for determining a device pointed to by a user equipment (UE), the computer program, when executed by a computer causes the computer to perform a method comprising:
determining UE pointing information based on spatial information of one or more Ultra Wide Band (UWB) devices; and
determining a target non-UWB device pointed to by the UE based on the UE pointing information and spatial information of at least one non-UWB device,
wherein the UE pointing information comprises information indicating a pointing direction of the UE.

* * * * *